US011445552B2

(12) United States Patent
Sun et al.

(10) Patent No.: US 11,445,552 B2
(45) Date of Patent: Sep. 13, 2022

(54) TRIGGERED PHYSICAL RANDOM ACCESS CHANNEL FOR NEW RADIO UNLICENSED

(71) Applicant: QUALCOMM Incorporated, San Diego, CA (US)

(72) Inventors: Jing Sun, San Diego, CA (US); Andrei Dragos Radulescu, San Diego, CA (US); Ananta Narayanan Thyagarajan, Bangalore (IN); Pravjyot Singh Deogun, Bangalore (IN); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 16/735,370

(22) Filed: Jan. 6, 2020

(65) Prior Publication Data

US 2020/0245367 A1  Jul. 30, 2020

(30) Foreign Application Priority Data

Jan. 25, 2019  (IN) .............................. 201921003134

(51) Int. Cl.
*H04W 4/00* (2018.01)
*H04W 74/08* (2009.01)
*H04W 72/04* (2009.01)

(52) U.S. Cl.
CPC ..... *H04W 74/0833* (2013.01); *H04W 72/042* (2013.01); *H04W 72/0446* (2013.01); *H04W 72/0453* (2013.01); *H04W 74/0808* (2013.01)

(58) Field of Classification Search
CPC ........... H04W 74/0833; H04W 72/042; H04W 72/0446; H04W 72/0453; H04W 74/0808
See application file for complete search history.

(56) References Cited

U.S. PATENT DOCUMENTS

2017/0303303 A1* 10/2017 Yang ..................... H04L 5/0048
2017/0332410 A1* 11/2017 Babaei .............. H04W 72/0446
(Continued)

OTHER PUBLICATIONS

International Search Report and Written Opinion—PCT/US2020/012608—ISA/EPO—dated Mar. 23, 2020 (191173WO).

(Continued)

*Primary Examiner* — Siren Wei
(74) *Attorney, Agent, or Firm* — Holland & Hart LLP/Qualcomm

(57) ABSTRACT

Methods, systems, and devices for wireless communications are described. A user equipment (UE) may obtain a signal received over a wireless channel, the signal configuring one or more random access parameters for the wireless channel. The UE may obtain a downlink control signal over the wireless channel, wherein the downlink control signal comprises an indication of a trigger and a location of one or more random access occasions for the UE. The UE may output, based at least in part on the downlink control signal, a random access signal for transmission on the wireless channel during at least one of the one or more random access occasions and according to the one or more random access parameters and the location. The UE may establish a connection with a base station based at least in part on the random access signal.

29 Claims, 20 Drawing Sheets

(56) References Cited

U.S. PATENT DOCUMENTS

| | | | | |
|---|---|---|---|---|
| 2019/0116615 A1* | 4/2019 | Harada | ............. | H04W 74/0808 |
| 2019/0215217 A1* | 7/2019 | Kim | ...................... | H04L 5/0048 |
| 2019/0387546 A1* | 12/2019 | Li | ..................... | H04L 27/26025 |
| 2021/0037575 A1* | 2/2021 | Ohara | ............... | H04W 72/0406 |

OTHER PUBLICATIONS

TCL Communication: "On Paging and RACH Enhancements for NR-U", 3GPP Draft, 3GPP TSG RAN WG1 Meeting #95, R1-1812720_On_Paging_and_RACH_Enhancements_for_NR-U, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554679, 3 Pages, Retrieved from the Internet: URL: http://www.3gpp.org/ftp/Meetings%5F3GPP%5FSYNC/RAN1/Docs/R1%2D1812720%2Ezip, [retrieved on Nov. 11, 2018], the whole document.

* cited by examiner

TRIGGERED PHYSICAL RANDOM ACCESS CHANNEL FOR NEW RADIO UNLICENSED

CROSS REFERENCE

The present Applications for patent claims the benefit of India Provisional Patent Application No. 201921003134 by SUN, et al., entitled "TRIGGERED PHYSICAL RANDOM ACCESS CHANNEL FOR NEW RADIO UNLICENSED," filed Jan. 25, 2019, assigned to the assignee hereof, and expressly incorporated herein.

BACKGROUND

The following relates generally to wireless communications, and more specifically to triggered physical random access channel (PRACH) for New Radio (NR) unlicensed (NR-U).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support triggered physical random access channel (PRACH) for New Radio (NR) unlicensed (NR-U). Generally, the described techniques provide for downlink control information (DCI) triggered PRACH resources to increase or otherwise provide more random access opportunities or occasions. For example, the base station may configure a user equipment (UE) with various parameters for random access over a wireless channel. In some aspects, the wireless channel may include one or more channels in a shared or unlicensed radio frequency spectrum band. The base station may transmit or otherwise output a downlink control signal (e.g., DCI) to the UE that triggers one or more random access occasions and/or provides an indication of, or otherwise identifies, the location (e.g., time, frequency, and/or spatial location) for the triggered random access occasions. Accordingly, the UE may transmit or otherwise output a random access signal for transmission over the wireless channel during at least one of the triggered random access occasions. The UE may utilize the configured random access parameters when transmitting or otherwise outputting the random access signal. The UE may establish a connection with the base station based at least in part on the random access signal, and corresponding random access procedure. For example, the UE may establish a connection with a new base station in an initial access situation or may establish a connection with a target base station in a mobility management situation.

A method of wireless communication at a UE is described. The method may include obtaining a signal received over a wireless channel, the signal configuring one or more random access parameters for the wireless channel, obtaining a downlink control signal over the wireless channel, where the downlink control signal includes an indication of a trigger and a location of one or more random access occasions for the UE, outputting, based on the downlink control signal, a random access signal for transmission on the wireless channel during at least one of the one or more random access occasions and according to the one or more random access parameters and the location, and establishing a connection with a base station based on the random access signal.

An apparatus for wireless communication at a UE is described. The apparatus may include a processor, memory in electronic communication with the processor, and instructions stored in the memory. The instructions may be executable by the processor to cause the apparatus to obtain a signal received over a wireless channel, the signal configuring one or more random access parameters for the wireless channel, obtain a downlink control signal over the wireless channel, where the downlink control signal includes an indication of a trigger and a location of one or more random access occasions for the UE, output, based on the downlink control signal, a random access signal for transmission on the wireless channel during at least one of the one or more random access occasions and according to the one or more random access parameters and the location, and establish a connection with a base station based on the random access signal.

Another apparatus for wireless communication at a UE is described. The apparatus may include means for obtaining a signal received over a wireless channel, the signal configuring one or more random access parameters for the wireless channel, obtaining a downlink control signal over the wireless channel, where the downlink control signal includes an indication of a trigger and a location of one or more random access occasions for the UE, outputting, based on the downlink control signal, a random access signal for transmission on the wireless channel during at least one of the one or more random access occasions and according to the one or more random access parameters and the location, and establishing a connection with a base station based on the random access signal.

A non-transitory computer-readable medium storing code for wireless communication at a UE is described. The code may include instructions executable by a processor to obtain a signal received over a wireless channel, the signal configuring one or more random access parameters for the wireless channel, obtain a downlink control signal over the wireless channel, where the downlink control signal includes an indication of a trigger and a location of one or more random access occasions for the UE, output, based on the downlink control signal, a random access signal for transmission on the wireless channel during at least one of the one or more random access occasions and according to the one or more random access parameters and the location, and establish a connection with a base station based on the random access signal.

Some examples of the method, apparatuses, and non-transitory computer-readable medium described herein may further include operations, features, means, or instructions for identifying, based on the downlink control signal, a timing offset between a reference point and a time instance where random access occasions may be triggered, where the reference point may be either a reception of the downlink control signal or may be a network-configured via common control signaling reference point.

Some examples of the method, apparatuses, and non-transitory computer-readable medium described herein may further include operations, features, means, or instructions for updating at least one of the one or more random access parameters based on the downlink control signal.

Some examples of the method, apparatuses, and non-transitory computer-readable medium described herein may further include operations, features, means, or instructions for performing, based on the random access signal, a outputting of the random access signal for transmission.

Some examples of the method, apparatuses, and non-transitory computer-readable medium described herein may further include operations, features, means, or instructions for outputting, for transmission to the base station, an indication of intent to transmit the random access signal during the at least one of the one or more random access occasions, where the indication of intent to transmit the random access signal may be output for transmission prior to the one or more random access occasions used for transmission of the random access signal.

Some examples of the method, apparatuses, and non-transitory computer-readable medium described herein may further include operations, features, means, or instructions for initiating a listen-before-talk (LBT) procedure prior to outputting the random access signal for transmission.

In some examples of the method, apparatuses, and non-transitory computer-readable medium described herein, the downlink control signal includes at least one of a first timing offset for a random access occasion relative to the downlink control signal, a second timing offset for a random access occasion relative to a reference point indicated by a network, a time-frequency resource for the random access signal, an index value corresponding to a time-frequency resource for the random access signal, a preamble configuration for the random access signal, a time duration in which the one or more random access occasions may be triggered, a configuration to map one or more synchronization signal blocks to one or more random access occasions and random access preambles, an indication of a subset of the one or more random access occasions, an indication of a symbol occurring prior to a random access occasion in which an intent to transmit transmission will occur, a LBT configuration associated with one or more random access occasions, or a combination thereof.

In some examples of the method, apparatuses, and non-transitory computer-readable medium described herein, the one or more random access parameters include at least one of a random access signal waveform configuration, a format for the random access signal, a time-frequency resource for the random access signal, a repetition factor for a pattern of one or more random access occasions, a preamble configuration for the random access signal, a timing advance for the random access signal, an indication of a symbol occurring prior to a random access occasion in which an intent to transmit transmission will occur, a first timing offset for a random access occasion relative to the downlink control signal, a second timing offset for a random access occasion relative to a reference point indicated by a network, a time duration in which the one or more random access occasions may be triggered, a LBT configuration associated with one or more random access occasions, or a combination thereof.

In some examples of the method, apparatuses, and non-transitory computer-readable medium described herein, the signal configuring the one or more random access parameters includes an indication of at least one of a control resource set, a search space configuration, a downlink control signal format, or a combination thereof, for obtaining the downlink control signal.

In some examples of the method, apparatuses, and non-transitory computer-readable medium described herein, the signal configuring the one or more random access parameters includes at least one of a radio resource control signal (RRC), a system information signal, or a combination thereof.

A method of wireless communication at a base station is described. The method may include outputting a signal for transmission over a wireless channel, the signal configuring one or more random access parameters for the wireless channel, outputting a downlink control signal for transmission over the wireless channel, where the downlink control signal includes an indication of a trigger and a location of one or more random access occasions for a UE, obtaining, based on the downlink control signal, a random access signal received over the wireless channel during at least one of the one or more random access occasions and according to the one or more random access parameters and the location, and establishing a connection with the UE based on the random access signal.

An apparatus for wireless communication at a base station is described. The apparatus may include a processor, memory in electronic communication with the processor, and instructions stored in the memory. The instructions may be executable by the processor to cause the apparatus to output a signal for transmission over a wireless channel, the signal configuring one or more random access parameters for the wireless channel, output a downlink control signal for transmission over the wireless channel, where the downlink control signal includes an indication of a trigger and a location of one or more random access occasions for a UE, obtain, based on the downlink control signal, a random access signal received over the wireless channel during at least one of the one or more random access occasions and according to the one or more random access parameters and the location, and establish a connection with the UE based on the random access signal.

Another apparatus for wireless communication at a base station is described. The apparatus may include means for outputting a signal for transmission over a wireless channel, the signal configuring one or more random access parameters for the wireless channel, outputting a downlink control signal for transmission over the wireless channel, where the downlink control signal includes an indication of a trigger and a location of one or more random access occasions for a UE, obtaining, based on the downlink control signal, a random access signal received over the wireless channel during at least one of the one or more random access occasions and according to the one or more random access parameters and the location, and establishing a connection with the UE based on the random access signal.

A non-transitory computer-readable medium storing code for wireless communication at a base station is described. The code may include instructions executable by a processor to output a signal for transmission over a wireless channel, the signal configuring one or more random access parameters for the wireless channel, output a downlink control signal for transmission over the wireless channel, where the downlink control signal includes an indication of a trigger and a location of one or more random access occasions for a UE, obtain, based on the downlink control signal, a random access signal received over the wireless channel during at least one of the one or more random access occasions and according to the one or more random access parameters and the location, and establish a connection with the UE based on the random access signal.

Some examples of the method, apparatuses, and non-transitory computer-readable medium described herein may further include operations, features, means, or instructions for configuring the downlink control signal to indicate a timing offset between a reference point and a time instance when random access occasions may be triggered, where the reference point may be either the transmission of the downlink control signal or may be a network-configured via common control signaling reference point.

Some examples of the method, apparatuses, and non-transitory computer-readable medium described herein may further include operations, features, means, or instructions for configuring the downlink control signal to indicate an update for at least one of the one or more random access parameters.

In some examples of the method, apparatuses, and non-transitory computer-readable medium described herein, the downlink control signal may be associated with a subset of the one or more random access occasions and a corresponding subset of random access preambles.

Some examples of the method, apparatuses, and non-transitory computer-readable medium described herein may further include operations, features, means, or instructions for obtaining, prior to obtaining the random access signal, an indication of intent to transmit the random access signal during the at least one of the one or more random access occasions, where the indication of intent to transmit the random access signal may be obtained prior to the one or more random access occasions used for transmission of the random access signal.

Some examples of the method, apparatuses, and non-transitory computer-readable medium described herein may further include operations, features, means, or instructions for initiating a LBT procedure prior to outputting at least one of the signal, the downlink control signal, or a combination thereof, for transmission.

In some examples of the method, apparatuses, and non-transitory computer-readable medium described herein, the downlink control signal includes at least one of a first timing offset for a random access occasion relative to the downlink control signal, a second timing offset for a random access occasion relative to a reference point indicated by a network, a time-frequency resource for the random access signal, an index value corresponding to a time-frequency resource for the random access signal, a preamble configuration for the random access signal, a time duration in which the one or more random access occasions may be triggered, a configuration to map one or more synchronization signal blocks to one or more random access occasions and random access preambles, an indication of a subset of the one or more random access occasions, an indication of a symbol occurring prior to a random access occasion in which an intent to transmit transmission will occur, a LBT configuration associated with one or more random access occasions, or a combination thereof.

In some examples of the method, apparatuses, and non-transitory computer-readable medium described herein, the one or more random access parameters include at least one of a random access signal waveform configuration, a format for the random access signal, a time-frequency resource for the random access signal, a repetition factor for a pattern of one or more random access occasions, a preamble configuration for the random access signal, a timing advance for the random access signal, an indication of a symbol occurring prior to a random access occasion in which an intent to transmit transmission will occur, a first timing offset for a random access occasion relative to the downlink control signal, a second timing offset for a random access occasion relative to a reference point indicated by a network, a time duration in which the one or more random access occasions may be triggered, a LBT configuration associated with one or more random access occasions, or a combination thereof.

In some examples of the method, apparatuses, and non-transitory computer-readable medium described herein, the signal configuring the one or more random access parameters includes an indication of at least one of a control resource set, a search space configuration, a downlink control signal format, or a combination thereof, for obtaining the downlink control signal.

In some examples of the method, apparatuses, and non-transitory computer-readable medium described herein, the signal configuring the one or more random access parameters includes at least one of a RRC signal, a system information signal, or a combination thereof.

DETAILED DESCRIPTION

Figure 1:
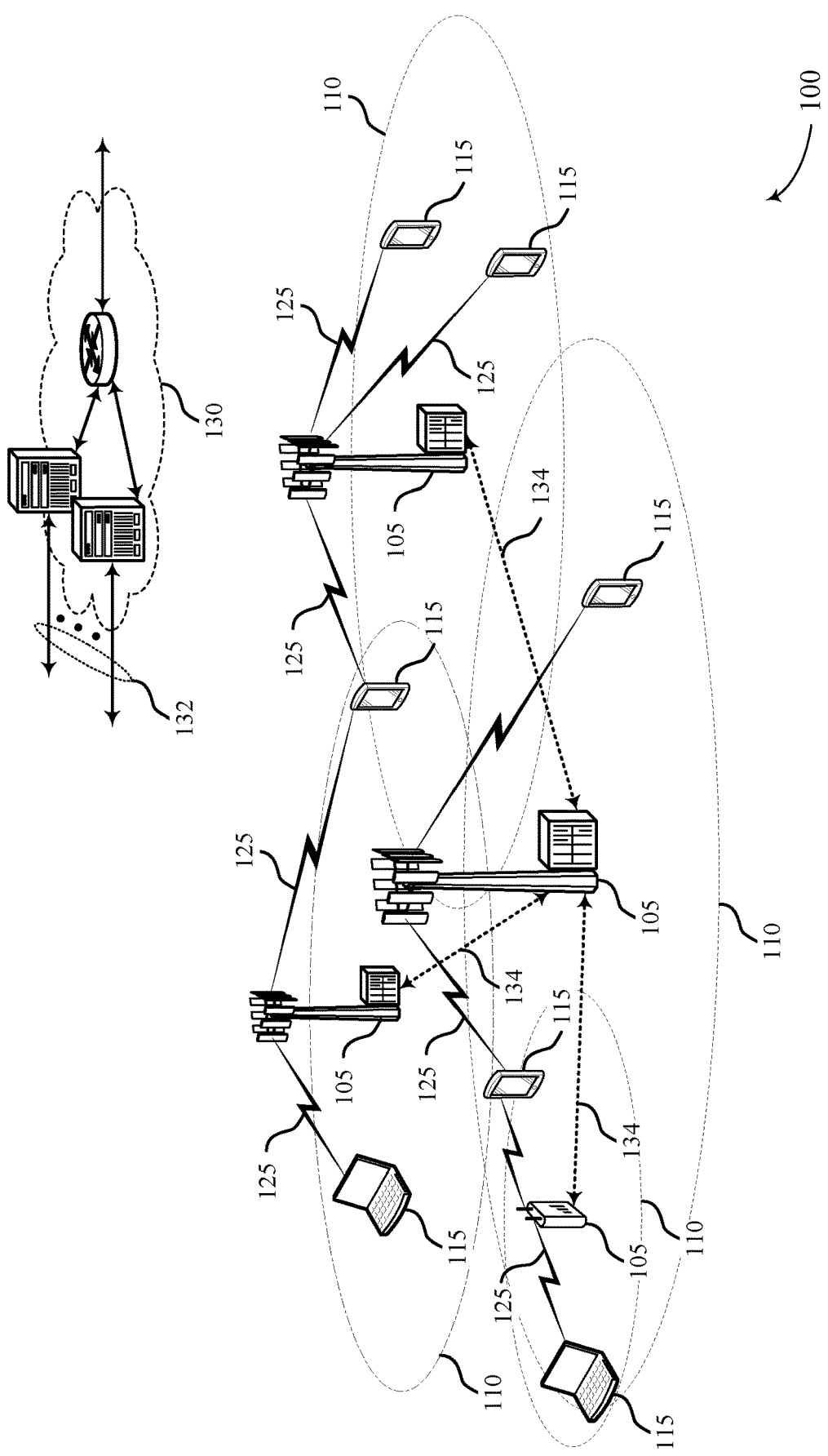
FIG. 1 illustrates an example of a system for wireless communications that supports triggered physical random access channel (PRACH) for New Radio (NR) unlicensed (NR-U) in accordance with aspects of the present disclosure.

Some wireless networks may operate in a shared or unlicensed radio frequency spectrum band. For example, the base station and/or user equipment (UE) may be communicating over one or more wireless channels in the unlicensed or shared radio frequency spectrum band, where a listen-before-talk (LBT) procedure must be performed on the wireless channel before transmission. The LBT procedure may be successful in that the wireless device acquires the channel for a channel occupancy time, or unsuccessful in that the wireless device fails to capture the channel. This may create difficulty when trying to access preconfigured resources, such as resources used for random access over a physical random access channel (PRACH). Accordingly, it may be beneficial to increase or otherwise provide additional random access opportunities (or random access occasions) for use when operating in a shared or unlicensed radio frequency spectrum band.

Wireless networks typically utilize random access procedures for such things as initial access, mobility management, and the like. The random access procedures may be performed on or via a PRACH where PRACH resources are configured for, or otherwise known by, the UE. Accordingly, the UE may identify the PRACH resources and perform various random access transmissions in order to establish a connection with the base station. Conventionally, the PRACH resources are configured based on the assumption that the resources will be available when needed, such as in a licensed radio frequency spectrum band. However, some wireless networks may operate in a shared or unlicensed radio frequency spectrum band, which requires a listen-before-talk (LBT) procedure to be performed on the wireless channel before access. In some instances, the LBT procedure may be unsuccessful such that the configured PRACH resources are not available to the UE.

Aspects of the disclosure are initially described in the context of a wireless communication system. Broadly, aspects of the described techniques provide for triggered random access occasions that can be utilized for a wireless channel in a licensed and/or an unlicensed radio frequency spectrum band. For example, a base station may configure a UE with at least some of the random access parameters for the wireless channel. For example, the base station may configure the UE with the waveform configuration, format, the repetition factor, preamble configuration, and the like, for a random access signal. The base station may then transmit or otherwise output a downlink control signal (e.g., a downlink control information (DCI) signal) to the UE that triggers one or more random access occasions and/or indicates or otherwise identifies the location for the triggered random access occasions (e.g., the time, frequency, and/or spatial location for the triggered random access occasions). In some aspects, the DCI indicating the location of the random access occasions may serve as the indication of the trigger for those random access occasions. Accordingly, the UE may transmit or otherwise output a random access signal over the wireless channel and during at least one of the triggered random access occasions. The UE may output the random access signal according to some or all of the configured random access parameters and/or the location indicated in the DCI. The UE may establish a connection with a base station based on the random access signal.

Aspects of the disclosure are further illustrated by and described with reference to apparatus diagrams, system diagrams, and flowcharts that relate to triggered PRACH for New Radio (NR) unlicensed (NR-U).

FIG. 1 illustrates an example of a wireless communication system 100 that supports triggered PRACH for NR-U in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ NR-U, License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM)

techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may obtain a signal received over a wireless channel, the signal configuring one or more random access parameters for the wireless channel. The UE 115 may obtain a downlink control signal over the wireless channel, wherein the downlink control signal comprises an indication of a trigger and a location of one or more random access occasions for the UE 115. The UE 115 may output, based at least in part on the downlink control signal, a random access signal for transmission on the wireless channel during at least one of the one or more random access occasions and according to the one or more random access parameters and the location. The UE 115 may establish a connection with a base station 105 based at least in part on the random access signal.

In some aspects, a base station 105 may output a signal for transmission over a wireless channel, the signal configuring one or more random access parameters for the wireless channel. The base station 105 may output a downlink control signal for transmission over the wireless channel, wherein the downlink control signal comprises an indication of a trigger and a location of one or more random access occasions for a UE 115. The base station 105 may obtain, based at least in part on the downlink control signal, a random access signal received over the wireless channel during at least one of the one or more random access occasions and according to the one or more random access parameters and the location. The base station 105 may establish a connection with the UE 115 based at least in part on the random access signal.

In some aspects, NR-U may adopt aspects of NR licensed protocols that include RRC configured PRACH opportunities (e.g., random access occasions). However, due to the nature of a wireless channel in the unlicensed radio frequency spectrum band, high density PRACH opportunities will not be scheduled to conserve medium congestion. The PRACH transmission may also be subject to LBT, so the UE 115 may not be able to take advantage of the configured PRACH transmission opportunities. For example, NR may support initial random access channel (RACH) resources being provided using remaining minimum system information (RMSI) and RACH resources for mobility (e.g., handover, beam recovery/management, etc.) being provided in UE-specific RRC signaling. For initial access UEs 115, the benefit of having triggered PRACH is to allow faster access, e.g., the UE 115 would otherwise have to wait for the RMSI configured regular PRACH, which can be sparse in some networks.

Moreover, multi-fire (MF) protocols may utilize triggered PRACH using a design that includes fixed location within a channel occupancy time (e.g., in the special sub-frame at the beginning of an uplink portion of the channel occupancy time). For example, MF triggered PRACH occurs inside the channel occupancy time and happens at a fixed location within the channel occupancy time. More particularly, the triggered PRACH is at the special subframe at the beginning of the uplink burst. Because the location of the PRACH opportunities within the channel occupancy time is fixed, the signal triggering the MF configured PRACH being triggered does not carry or otherwise convey an indication of the location of the PRACH opportunities.

Accordingly, aspects of the described techniques support RMSI based triggered PRACH configuration. The RMSI based configuration may, in some examples, have complexity limitations and/or size restrictions. The RMSI based configuration may be used by idle and connected mode UEs 115. Aspects of the described techniques further support UE-specific configurations for triggered PRACH to support more complex features. For example and for a connected mode UE 115, the described techniques may configure more complex structure for the triggered PRACH since it can use UE-specific configurations. In some examples, the UE-specific configurations may be used for non-standalone network deployments. Aspects of the described techniques may support multiple configurations of PRACH resources and choosing which one(s) to trigger in the triggering DCI (e.g., the downlink control signal). The described techniques may provide additional PRACH opportunities, such as when operating in a shared or unlicensed radio frequency spectrum band. That may reduce access time for UEs 115 and provide increased flexibility for the base stations 105 and/or UEs 115.

Figure 2:
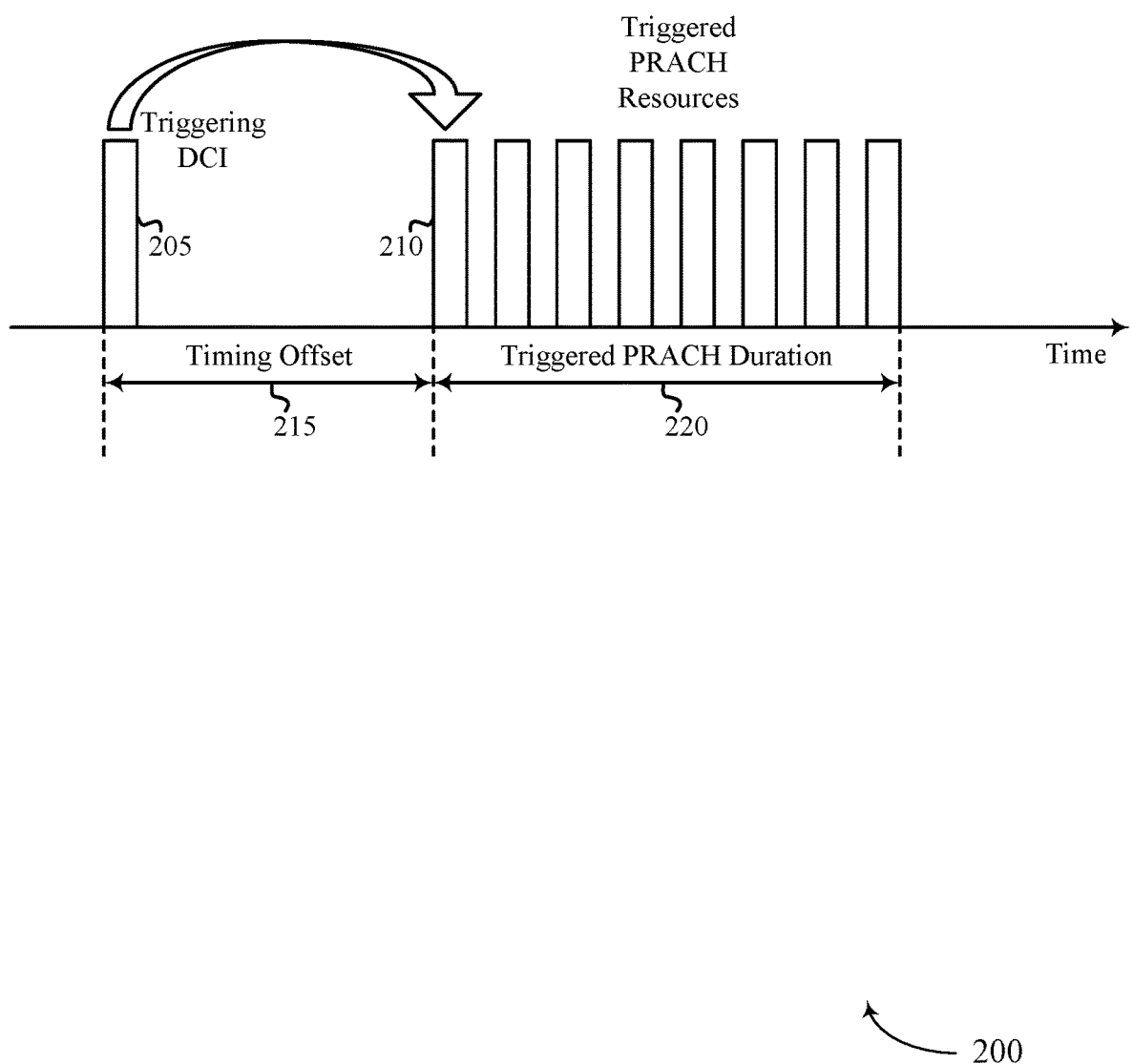
FIG. 2 illustrates an example of a timing diagram that supports triggered PRACH for NR-U in accordance with aspects of the present disclosure.

FIG. 2 illustrates an example of a timing diagram 200 that supports triggered PRACH for NR-U in accordance with aspects of the present disclosure. In some examples, timing diagram 200 may implement aspects of wireless communication system 100. Aspects of timing diagram 200 may be implemented by a base station and/or a UE, which may be examples of corresponding devices described herein. In some aspects, timing diagram 200 may be implemented over a wireless channel of a licensed and/or a shared or unlicensed radio frequency spectrum band.

Conventionally, wireless networks are configured such that random access resources (e.g., PRACH resources) are configured for initial access and/or mobility management purposes. For example, a base station may utilize system information signaling (e.g., such as RMSI signaling) to configure initial access random access resources and/or may utilize RRC signaling to configure random access resources for mobility (e.g., handover, beam recovery, and the like) that are UE-specific. However, some wireless networks may perform wireless transmissions or otherwise operate in a shared or unlicensed radio frequency spectrum band. For such wireless devices, a LBT procedure must be performed on the wireless channel before access, which may or may not be successful. When unsuccessful, the wireless device may not capture the channel for transmission, and may therefore be unable to access the configured random access resources. Accordingly, aspects of the described techniques increase the number of random access occasions available for use, and dynamically trigger such random access occasions. This may improve reliability in accessing random access resources and/or reduce the latency of such random access procedures.

For example, aspects of the described techniques may include a base station transmitting or otherwise outputting a signal over a wireless channel to a UE that configures one or more random access parameters for the wireless channel. For example, the base station may configure the UE with a waveform configuration for a random access signal (e.g., a PRACH waveform, such as a legacy or block interlace waveform configuration). The base station may configure the UE with the format for the random access signal (e.g., a PRACH format, such as A1, A2, and the like). The base station may configure the UE with a time-frequency resource for the random access signal (e.g., time/frequency domain resources, such as how many triggered random access occasions in time and/or frequency). The base station may configure the UE with a repetition factor for a pattern of the random access occasions (e.g., this may include indicating the number of repetitions of a specific pattern of random access occasions, all of which may be triggered by a single DCI). The base station may configure the UE with a preamble configuration for the random access signal (e.g., such as a contention free random access and contention based random access preamble split). The base station may configure the UE with a timing advance of the random access signal (e.g., whether any timing advance needs to be applied for the random access signal). The base station may configure the UE with an indication of a symbol occurring prior to random access occasions in which an intent to transmit transmission will occur (e.g., the details of whether one or more OFDM symbols to be transmitted before the triggered random access occasion start if the UE is going to use the random access occasions).

The base station may configure the UE with one or more timing offsets (e.g., a set of time offsets that can be used in conjunction with the triggering DCI to locate the random access resources). For example, the base station may configure the UE with the first set of timing offsets for a random access occasion that is relative to a downlink control signal (e.g., DCI) and/or a second set of timing offsets for the random access occasion that is relative to a network configured reference point. That is, the base station can indicate to the UE whether the time offset is relative to the trigger (DCI) or an uplink burst in a channel occupancy time (e.g., slot format indicator/channel occupancy time indicator).

The base station may configure the UE with a time duration in which the one or more random access occasions are triggered. For example, the base station may configure the UE with the time duration or number of cycles (e.g., the cycle may correspond to one mapping cycle of synchronization signal block to random access occasions or the cycle may correspond to an association period or PRACH configuration period) for which the triggered random access resources are valid. In some aspects, this may be implicit, e.g., the triggered random access resources are only valid for an ongoing channel occupancy time. The base station may configure the UE with an LBT configuration for the random access occasions (e.g., LBT details, such as the type and parameters of LBT procedure to perform for each random access occasion or for inside or outside of the channel occupancy time, a contention window size, and the like).

In some aspects, the base station may utilize an RRC signal, an RMSI signal, and the like, to configure the random access parameters for the UE. For example, the base station may broadcast the random access parameters for initial access UEs using RMSI signaling. The base station may use UE-specific RRC signaling to configure such parameters for the UE to utilize in mobility management.

In some aspects, the base station may additionally use the signal configuring the random access parameters to carry or otherwise convey an indication of where the UE is to look for the downlink control signal triggering the random access occasions. For example, the signal may carry or convey an indication of the search space configuration, a control resource set, and/or a format of the downlink control signal, and the like, for the triggering downlink control signal (e.g., the triggering DCI). That is, the base station may configure or otherwise indicate to the UE how to monitor for the triggering DCI. The signal may indicate or otherwise identify which control resource set the UE is to monitor, e.g., such as control resource set 0, which may be configured in physical broadcast channel for RMSI-based configurations or can contain the control resource set used for paging occasions. The base station may configure or otherwise indicate to the UE which search space, time instance, aggregation level (or set of aggregation levels), the number of decoding candidates, and the like, to monitor for the triggering DCI. The base station may configure or otherwise indicate to the UE the DCI format, which radio network temporary identifier (RNTI) is used, a length of the DCI, which bid/field in the DCI is used to indicate the trigger, and the like. In some aspects, the search space/control resource set may be different for UE-specific RRC signaling and RMSI-based signaling. For example, not all of the information may be applied in the signal configuring the random access parameters. For example, RMSI-based configuration may use a smaller number of parameters than RRC-based dedicated UE configuration. This may support selectively triggering initial access or connected mode UEs.

The base station may configure or otherwise output an indication of one, some (in any combination), or all of the random access parameters. Subsequently, the base station may transmit or otherwise output a downlink control signal 205 (e.g., the triggering DCI) to the UE that triggers and/or indicates the location for random access occasions 210 (e.g., the triggered PRACH resources, with eight random access occasions 210 being shown by way of example only). In some aspects, the downlink control signal 205 (e.g., the triggering DCI) may be carried or conveyed in a discovery reference signal. For example, within the discovery reference signal, a downlink control signal may be in the form of a DCI or can be in the form of PBCH information, or the downlink control signal 205 may come near a discovery reference signal occasion. Using the discovery reference signal may reduce the search space in which the UE needs to monitor to detect the downlink control signal.

In some aspects, the downlink control signal 205 may simply identify the location of the random access occasions 210 (e.g., the time, frequency, and/or spatial location), where identifying the location in the downlink control signal 205 acts or otherwise serves as the trigger for the random access occasions 210. In other aspects, the control signal 205 may carry or convey a separate bit/field that indicates whether or not the random access occasions 210 are being triggered (e.g., a triggering bit or field), and a different bit/field indicating the location of the triggered random access occasions 210. In some aspects, the downlink control signal 205 may carry or convey additional and/or updated information, which the UE may use when transmitting a random access signal during the random access occasions 210.

For example, the downlink control signal 205 may carry or convey timing offset 215 information (e.g., one of the time offset values from the configuration), in the uplink grant indicating when the triggered random access occasions 210 occur. In some aspects, the UE may also use the channel occupancy time indicator and/or slot format indicator from the control signal (e.g., common PDCCH (CPDCCH) or group common-PDCCH) to determine or otherwise identify a start of uplink, and use the timing offset from the configuration (e.g., RMSI and/or RRC signaling) to compute the location of the random access occasions 210, e.g., to compute the timing offset 215. For example, the downlink control signal 205 may carry or otherwise convey an indication of a first timing offset for random access occasion 210 relative to the downlink control signal 205. In another example, the downlink control signal 205 may carry or otherwise convey an indication of a second timing offset relative to a reference point indicated by the network. For example, the reference point may be a start time of the channel occupancy time.

In some aspects, the downlink control signal 205 may carry or otherwise convey an indication of a time-frequency resource for the random access signal (e.g., the location in time, frequency, spatially, and the like). For example, the downlink control signal 205 may carry or convey an indication of a resource selection, such as what the acknowledgment resource indicator (ARI) is doing in the downlink grant (e.g., the downlink control signal 205). In some aspects, this may include pre-configuring multiple random access resources, and the downlink control signal 205 dynamically indicating to one (or more) of the preconfigured random access resources (e.g., an index value corresponding to a time-frequency resource for the random access signal). In some aspects, the time-frequency resource for the random access signal may change the time/frequency domain resource configured in the random access parameters. For example, the UE may update one or more of the random access parameters used for random access signal transmission using updated time-frequency resources indicated in the downlink control signal 205.

In some aspects, the downlink control signal 205 may carry or convey an indication of a preamble configuration for the random access signal. For example, the downlink control signal 205 may carry a preamble configuration for a contention based random access and/or contention free random access. In some aspects, the downlink control signal 205 may carry a preamble configuration corresponding to a contention based random access and contention free random access split of preambles.

In some aspects, the downlink control signal 205 may carry or convey an indication of a time duration 220 in which the one or more random access occasions 210 are triggered. For example, the time duration indicated in the downlink control signal 205 may signal the time duration 220 and/or correspond to the number of cycles for which the triggered random access occasions 210 are valid. That is, when multiple random access occasions 210 are triggered, the downlink control signal 205 may indicate the number of random access occasions 210 and/or time validity of random access occasions 210 that are triggered. For example, the downlink control signal 205 may indicate that the triggered random access occasions 210 are valid for a certain number of slots, subframes, frames, and the like.

In some aspects, the downlink control signal 205 may carry or otherwise convey an indication of a configuration mapping synchronization signal block(s) SSB(s). For example, the downlink control signal 205 may carry or convey an indication of which (e.g., which SSB(s)) are associated with the triggered random access occasions 210. This may include using or otherwise indicating an SSB bitmap in the downlink control signal 205 indicating which SSBs are mapped to the triggered random access occasions 210. In some aspects, this may include a mapping from SSBs to random access occasions 210 being defined in the downlink control signal 205.

In some aspects, the downlink control signal 205 may carry or convey an indication of one or more subsets of the triggered random access occasions 210. For example, the downlink control signal 205 may identify a first subset (e.g., the first four) of random access occasions 210 and a first set of preambles that correspond to a first set of UE(s) and a second subset (e.g., the last four) of random access occasions 210 and a second set of preambles that correspond to a second set of UE(s). Here, the downlink control signal 205 may order the first set of UE(s) to perform random access transmission using the first subset of random access occasions and first set of preambles and/or order the second set of UE(s) to perform random access transmission using the second subset of random access occasions and second set of preambles.

In some aspects, the downlink control signal 205 may carry or convey an indication of a symbol occurring prior to a random access occasion 210 in which it intends to transmit the random access signal. For example, the downlink control signal 205 may indicate or otherwise trigger whether the intent to transmit signal (which may also be referred to as $OS_{ind}$, in that the UE may perform a one-shot LBT procedure prior to transmitting the intent to transmit transmission to the base station) is to be output. When configured or otherwise indicated, the UE may transmit or otherwise output the intent to transmit the random access signal during at least one of the triggered random access occasions 210 (e.g., during the first one). This may signal to the base station that the identified random access occasion 210 will be used by the UE for transmitting a random access signal. When configured or otherwise indicated, the base station may interpret an absence of the intent to transmit transmission as the random access occasion 210 being available, and therefore perform uplink and/or downlink communications using the random access resources associated with the unused random access occasion 210.

In some aspects, the downlink control signal 205 may carry or convey an indication of a LBT configuration associated with the random access occasions 210. For example, the downlink control signal 205 may carry or convey an indication of a contention window size, an LBT type, and the like, to be used for the triggered random access occasions 210.

Based on the downlink control signal 205, the UE may transmit or otherwise output a random access signal for transmission on the wireless channel during at least one of the triggered random access occasions 210. The UE may transmit or otherwise output the random access signal according to the configured (or updated) random access parameters and/or according to the location indicated in the downlink control signal 205. In some aspects, the random access signal may include a random access preamble or message one (Msg1) transmission used to initiate access to the base station by the UE. The UE and the base station may continue the random access procedure to establish a connection over the wireless channel. In some aspects, the connection may be established as part of an initial access procedure where the UE initially connects to a base station (e.g., using RMSI configured random access parameters) or as part of mobility management where the UE connects to a target base station (e.g., using UE-specific RRC configured random access parameters) during a handover.

As discussed above, in some examples the wireless channel may be over a shared or unlicensed radio frequency spectrum band. In this context, the base station and/or UE may perform LBT procedures on the wireless channel prior to transmitting, or otherwise providing for transmission, one or more of the above described signals.

Figure 3:
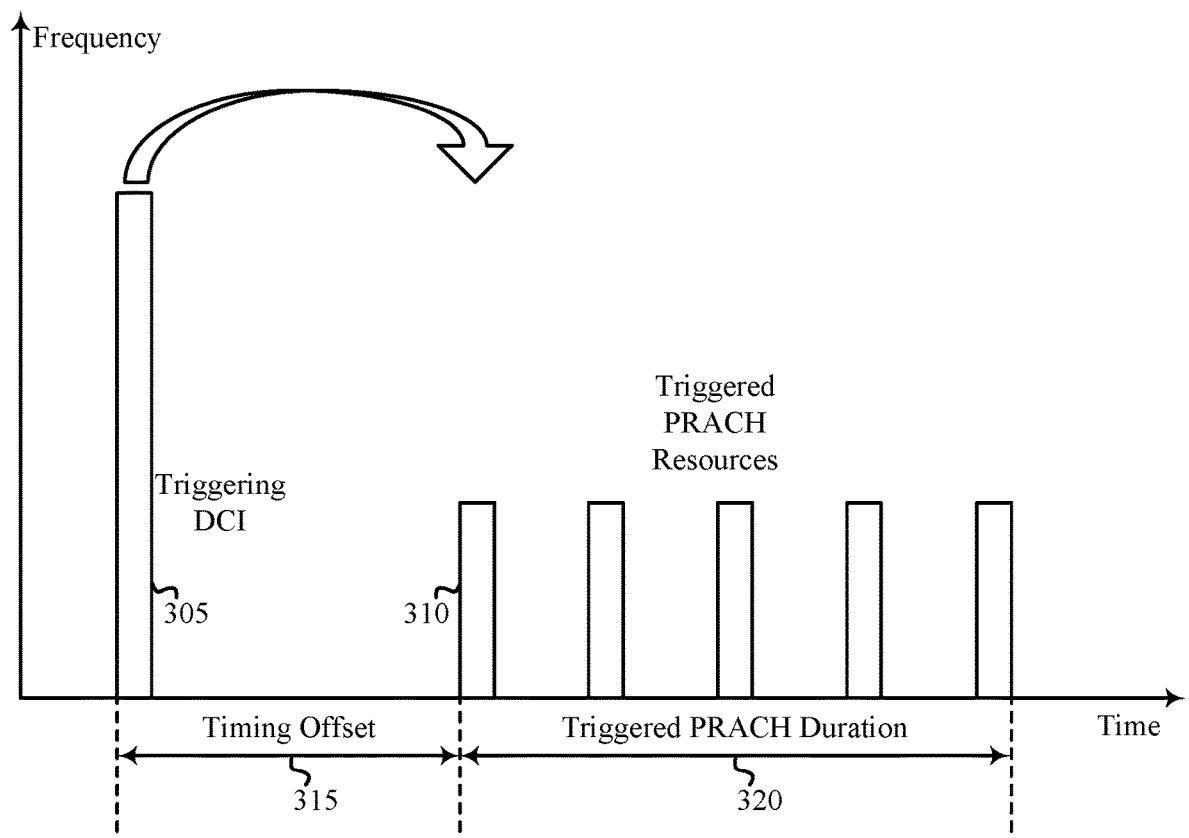
FIG. 3 illustrates an example of a timing diagram that supports triggered PRACH for NR-U in accordance with aspects of the present disclosure.

FIG. 3 illustrates an example of a timing diagram 300 that supports triggered PRACH for NR-U in accordance with aspects of the present disclosure. In some examples, timing diagram 300 may implement aspects of wireless communication system 100 and/or timing diagram 200. Aspects of timing diagram 300 may be implemented by a base station and/or a UE, which may be examples of corresponding devices described herein. In some aspects, timing diagram 300 may be implemented over a wireless channel of a licensed and/or a shared or unlicensed radio frequency spectrum band.

As discussed above, a base station may generally transmit or otherwise output for transmission a signal that configures random access parameter(s) for a wireless channel. The base station may then transmit or otherwise output for transmission a downlink control signal 305 (e.g., a triggering DCI) that carries or conveys an indication of the trigger and/or location of random access occasions 310 (e.g., triggered PRACH resources, with five triggered PRACH resources being shown by way of example only). In some aspects, the configured parameters and/or the downlink control signal 305 may carry or otherwise convey an indication of a timing offset 315, a time duration 320, and the like, for the triggered random access occasions 310. In some aspects, the downlink control signal 305 may carry or otherwise convey an indication of when (e.g., the random access occasions 310) random access signal transmissions may occur.

In some aspects, the downlink control signal 305 may also carry or otherwise convey an indication of time, frequency, and/or spatial resources corresponding to the random access occasions 310. In some aspects, the resource indication in the downlink control signal 305 may override or otherwise be used to update the configured random access parameters. For example, this may provide for a dynamically indicated trigger (e.g., via the downlink control signal 305) that changes of time, frequency, and/or spatial resources for the random access occasions 310.

In some aspects, the downlink control signal 305 may be transmitted on a wireless channel having a different bandwidth than is used or otherwise corresponds to the random access occasions 310. For example and as is illustrated in timing diagram 300, the downlink control signal 305 may be transmitted in a wideband transmission (e.g., spanning two or more channels, CCs, and the like), whereas the triggered random access occasions 310 are associated with a narrower bandwidth (e.g., spanning less channels, CCs, and the like, than is used for the downlink control signal 305).

In some aspects, the downlink control signal 305 may be transmitted over a frequency domain as is indicated in the signal configuring the random access parameters for the wireless channel, but may carry or convey an indication of a narrower bandwidth (e.g., an updated frequency domain parameter for the random access parameters). Accordingly, the triggered random access occasions 310 may correspond to, or otherwise be associated with, a narrower frequency band than was originally configured in the random access parameters for the wireless channel, as was used for transmission of the downlink control signal 305.

As also discussed above, some aspects the downlink control signal 305 may carry or convey an updated time duration 320 for the triggered random access occasions 310.

For example, the time duration 320 may be updated to decrease or increase the periodicity of a pattern of triggered random access occasions 310, to decrease or increase the duration of each triggered random access occasion 310, to decrease or increase the number of cycles (e.g., slots, subframes, frames, etc.) in which the triggered random access occasions 310 are valid, and so forth. In the example illustrated in timing diagram 300, the downlink control signal 305 carries or conveys an updated time duration 320 that increases the periodicity of a pattern of triggered random access occasions 310 (e.g., that increases the amount of time between each instance of a pattern of the triggered random access occasions 310).

In some aspects, the UE may transmit or otherwise output a random access signal for transmission on the wireless channel during at least one of the triggered random access occasions 310. In some aspects, the random access signal may be transmitted according to the random access parameters (as originally configured and/or as updated by the downlink control signal 305) and/or the location of the triggered random access occasions 310 indicated in the downlink control signal 305. The base station and UE may establish a connection based at least in part on the random access signal.

Figure 4:
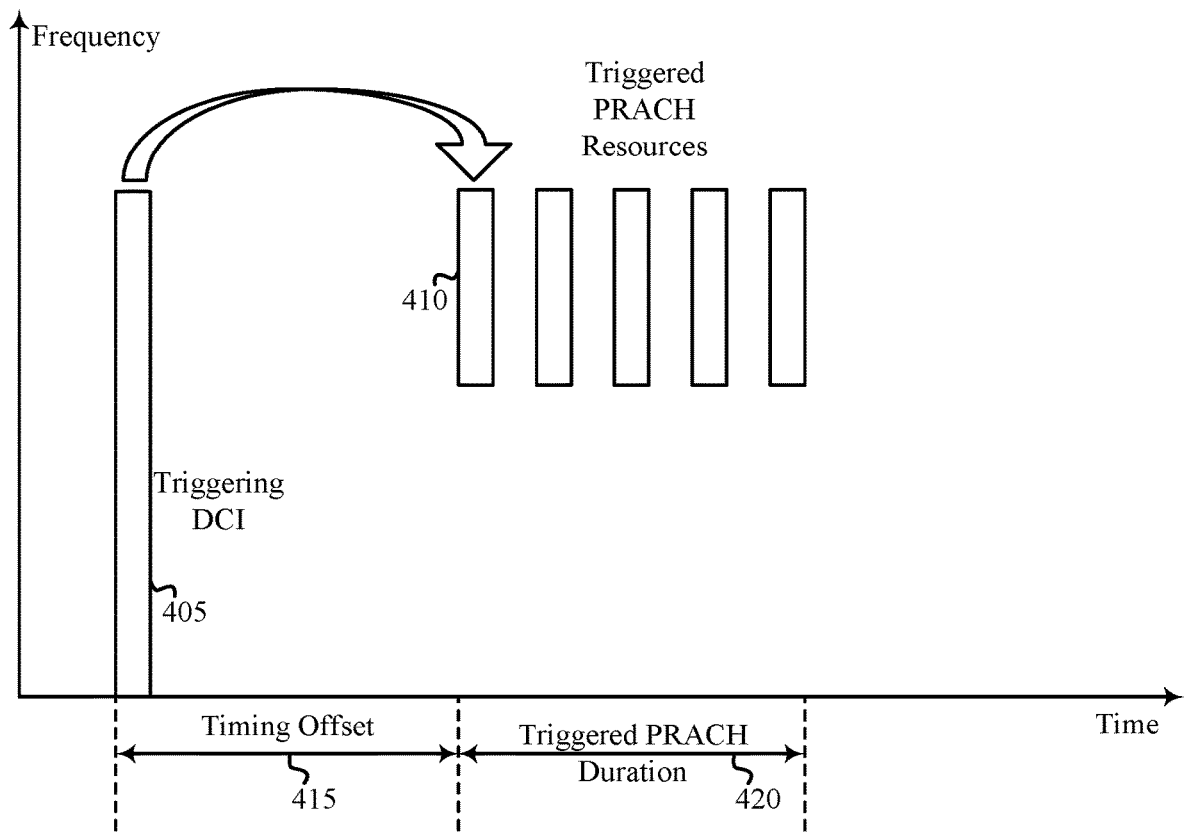
FIG. 4 illustrates an example of a timing diagram that supports triggered PRACH for NR-U in accordance with aspects of the present disclosure.

FIG. 4 illustrates an example of a timing diagram 400 that supports triggered PRACH for NR-U in accordance with aspects of the present disclosure. In some examples, timing diagram 400 may implement aspects of wireless communication system 100 and/or timing diagrams 200 and/or 300. Aspects of timing diagram 400 may be implemented by a base station and/or a UE, which may be examples of corresponding devices described herein. In some aspects, timing diagram 400 may be implemented over a wireless channel of a licensed and/or a shared or unlicensed radio frequency spectrum band.

As discussed above, a base station may generally transmit or otherwise output for transmission a signal that configures random access parameter(s) for a wireless channel. The base station may then transmit or otherwise provide for transmission a downlink control signal 405 (e.g., a triggering DCI) that carries or conveys an indication of the trigger and/or location of triggered random access occasions 410 (e.g., triggered PRACH resources, with five triggered PRACH resources being shown by way of example only). In some aspects, the configured parameters and/or the downlink control signal 405 may carry or otherwise convey an indication of a timing offset 415, a time duration 420, and the like, for the triggered random access occasions 410. In some aspects, the downlink control signal 405 may carry or otherwise convey an indication of when (e.g., the random access occasions 410) random access signal transmissions may occur.

In some aspects, the downlink control signal 405 may also carry or otherwise convey an indication of time, frequency, and/or spatial resources corresponding to the random access occasions 410. In some aspects, the resource indication in the downlink control signal 405 may override or otherwise be used to update the configured resources of the random access parameters. For example, this may provide for a dynamically indicated trigger (e.g., via the downlink control signal 405) that changes of time, frequency, and/or spatial resources for the random access occasions 410.

In some aspects, the downlink control signal 405 may be transmitted on a wireless channel having a different bandwidth than is used or otherwise corresponds to the random access occasions 410. For example and as is illustrated in timing diagram 400, the downlink control signal 405 may be transmitted in a wideband transmission (e.g., spanning two or more channels, CCs, and the like), whereas the triggered random access occasions 410 are associated with a narrower band transmission (e.g., spanning less channels, CCs, and the like, than is used for the downlink control signal 405).

In some aspects, the downlink control signal 405 may be transmitted over a frequency domain as is indicated in the signal configuring the random access parameters for the wireless channel, but may carry or convey an indication of a narrower bandwidth (e.g., an updated frequency domain parameter for the random access parameters). Accordingly, the triggered random access occasions 410 may correspond to, or otherwise be associated with, a narrower frequency band than was originally configured in the random access parameters for the wireless channel, and as was used for transmission of the downlink control signal 405.

As also discussed above, in some aspects the downlink control signal 405 may carry or convey an updated time duration 420 for the triggered random access occasions 410. For example, the time duration 420 may be updated to decrease or increase the periodicity of a pattern of triggered random access occasions 410, to decrease or increase the duration of each triggered random access occasion 410, to decrease or increase the number of cycles (e.g., slots, subframes, frames, etc.) in which the triggered random access occasions 410 are valid, and so forth. In the example illustrated in timing diagram 400, the downlink control signal 405 carries or conveys an updated time duration 420 that decreases the periodicity of a pattern of the triggered random access occasions 410 (e.g., that decreases the amount of time between each instance of a pattern of the triggered random access occasions 410).

In some aspects, the UE may transmit or otherwise output a random access signal for transmission on the wireless channel during at least one of the triggered random access occasions 410. In some aspects, the random access signal may be transmitted according to the random access parameters (as originally configured and/or as updated by the downlink control signal 405) and/or the location of the triggered random access occasions 410 indicated in the downlink control signal 405. The base station and UE may establish a connection based at least in part on the random access signal.

Figure 5:
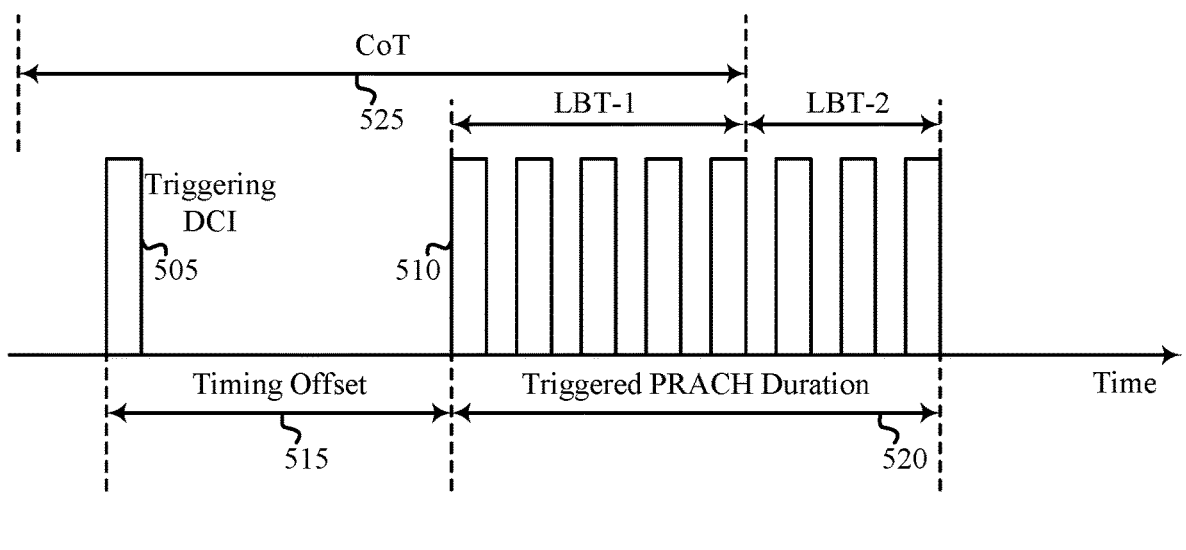
FIG. 5 illustrates an example of a timing diagram that supports triggered PRACH for NR-U in accordance with aspects of the present disclosure.

FIG. 5 illustrates an example of a timing diagram 500 that supports triggered PRACH for NR-U in accordance with aspects of the present disclosure. In some examples, timing diagram 500 may implement aspects of wireless communication system 100 and/or timing diagrams 200, 300, and/or 400. Aspects of timing diagram 500 may be implemented by a base station and/or a UE, which may be examples of corresponding devices described herein. In some aspects, timing diagram 500 may be implemented over a wireless channel of a licensed and/or a shared or unlicensed radio frequency spectrum band.

As discussed above, a base station may generally transmit or otherwise output for transmission a signal that configures random access parameter(s) for a wireless channel. The base station may then transmit or otherwise output for transmission a downlink control signal 505 (e.g., a triggering DCI) that carries or conveys an indication of the trigger and/or location of triggered random access occasions 510 (e.g., triggered PRACH resources, with eight triggered PRACH resources being shown by way of example only). In some aspects, the configured parameters and/or the downlink control signal 505 may carry or otherwise convey an indication of a timing offset 515, a time duration 520, and the like, for the triggered random access occasions 510. In some aspects, the downlink control signal 505 may carry or otherwise convey an indication of when (e.g., the random access occasions 510) random access signal transmissions may occur.

In some aspects, some or all of the triggered random access occasions 510 may be within or outside of a channel occupancy time 525. For example, the base station may perform an LBT procedure to capture the wireless channel for a channel occupancy time 525. The base station may determine or otherwise decide to transmit the downlink control signal 505 to trigger the random access occasions 510 during at least a portion of the channel occupancy time 525.

In some aspects, the downlink control signal 505 may also carry or otherwise convey an indication of a LBT configuration for the triggered random access occasions 510. In some aspects, the LBT configuration in the downlink control signal 505 may override or otherwise be used to update the configured resources of the random access parameters. For example, this may provide for different LBT behavior of the triggered random access occasions 510 inside and outside of the channel occupancy time 525. For example, the downlink control signal 505 may implicitly or explicitly indicate the LBT behavior for the triggered random access occasions 510. The UE may detect or otherwise identify the channel occupancy time 525 in order to determine or otherwise identify the triggered random access occasion 510 LBT behavior. In the example illustrated in timing diagram 500, the downlink control signal 505 may carry or convey an indication of a first LBT configuration (e.g., LBT-1 configuration) for the triggered random access occasions 510 occurring within the channel occupancy time 525, and carry or convey an indication of a second LBT configuration (e.g., LBT-2 configuration) for the triggered random access occasions occurring outside of (or after) the channel occupancy time 525.

In some aspects, the UE may transmit or otherwise output a random access signal for transmission on the wireless channel during at least one of the triggered random access occasions 510. For example, the UE may perform LBT procedures according to the first LBT configuration for triggered random access occasions 510 occurring within the channel occupancy time 525, and/or perform LBT procedures according to the second LBT configuration for triggered random access occasions 510 occurring outside of the channel occupancy time 525. In some aspects, the random access signal may be transmitted according to the random access parameters (as originally configured and/or as updated by the downlink control signal 505) and/or the location of the triggered random access occasions 510 indicated in the downlink control signal 505. The base station and UE may establish a connection based at least in part on the random access signal.

Figure 6:
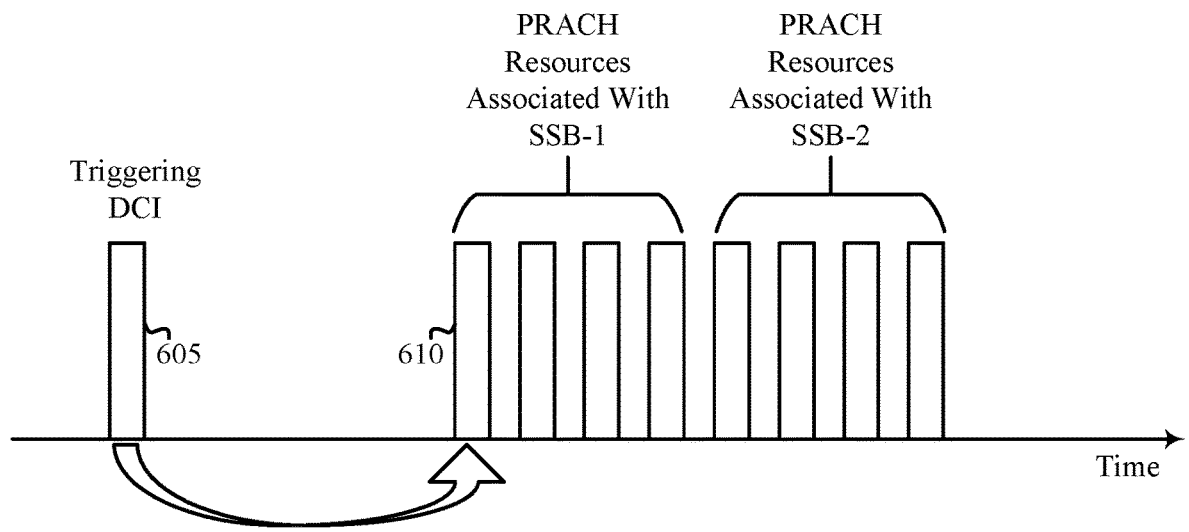
FIG. 6 illustrates an example of a timing diagram that supports triggered PRACH for NR-U in accordance with aspects of the present disclosure.

FIG. 6 illustrates an example of a timing diagram 600 that supports triggered PRACH for NR-U in accordance with aspects of the present disclosure. In some examples, timing diagram 600 may implement aspects of wireless communication system 100 and/or timing diagrams 200, 300, 400, and/or 500. Aspects of timing diagram 600 may be implemented by a base station and/or a UE, which may be examples of corresponding devices described herein. In some aspects, timing diagram 600 may be implemented over a wireless channel of a licensed and/or a shared or unlicensed radio frequency spectrum band.

As discussed above, a base station may generally transmit or otherwise output for transmission a signal that configures random access parameter(s) for a wireless channel. The base station may then transmit or otherwise output for transmission a downlink control signal 605 (e.g., a triggering DCI) that carries or conveys an indication of the trigger and/or location of triggered random access occasions 610 (e.g., triggered PRACH resources, with eight triggered PRACH resources being shown by way of example only). In some aspects, the configured parameters and/or the downlink control signal 605 may carry or otherwise convey an indication of a timing offset, a time duration, and the like, for the triggered random access occasions 610. In some aspects, the downlink control signal 605 may carry or otherwise convey an indication of when (e.g., the random access occasions 610) random access signal transmissions may occur.

In some aspects, some or all of the triggered random access occasions 610 may be associated with different SSBs. For example, a first subset of the triggered random access occasions 610 may be associated with a first set of SSB indices, with the second subset of the triggered random access occasions 610 being for a second set of SSB indices.

In some aspects, the downlink control signal 605 may also carry or otherwise convey an indication of a configuration to map one or more SSBs to one or more random access occasions 610 and random access preambles. In some aspects, the configuration in the downlink control signal 605 may override or otherwise be used to update the configuration indicated in the configured random access parameters. For example, this may provide for different behavior of the triggered random access occasions 610 for different UEs. For example, the downlink control signal 605 may include an SSB bitmap that indicates which SSBs are associated with the triggered random access occasions 610. In some aspects, the mapping between the SSBs and the random access occasions 610 (and corresponding random access preambles) may be configured beforehand, with the downlink control signal 605 indicating or otherwise identifying an index to at least one of the configured mappings. In the example illustrated in timing diagram 600, the downlink control signal 605 may carry or convey an indication of a first subset of triggered random access occasions 610 that are associated with a first SSB (SSB-1), and carry or convey an indication of a second subset of triggered random access occasions 610 that are associated with a second SSB (e.g., SSB-2).

In some aspects, the UE may transmit or otherwise output a random access signal for transmission on the wireless channel during at least one of the triggered random access occasions 610 and according to the SSB bitmap. For example, the UE may transmit or otherwise output the random access signal according to the first SSB (e.g., for triggered random access occasions 610 associated with SSB-1), and/or transmit or otherwise output the random access signal according to the second SSB (e.g., for triggered random access occasions 610 associated with SSB-2). In some aspects, the random access signal may be transmitted according to the random access parameters (as originally configured and/or as updated by the downlink control signal 605) and/or the location of the triggered random access occasions 610 indicated in the downlink control signal 605. The base station and UE may establish a connection based at least in part on the random access signal.

Figure 7:
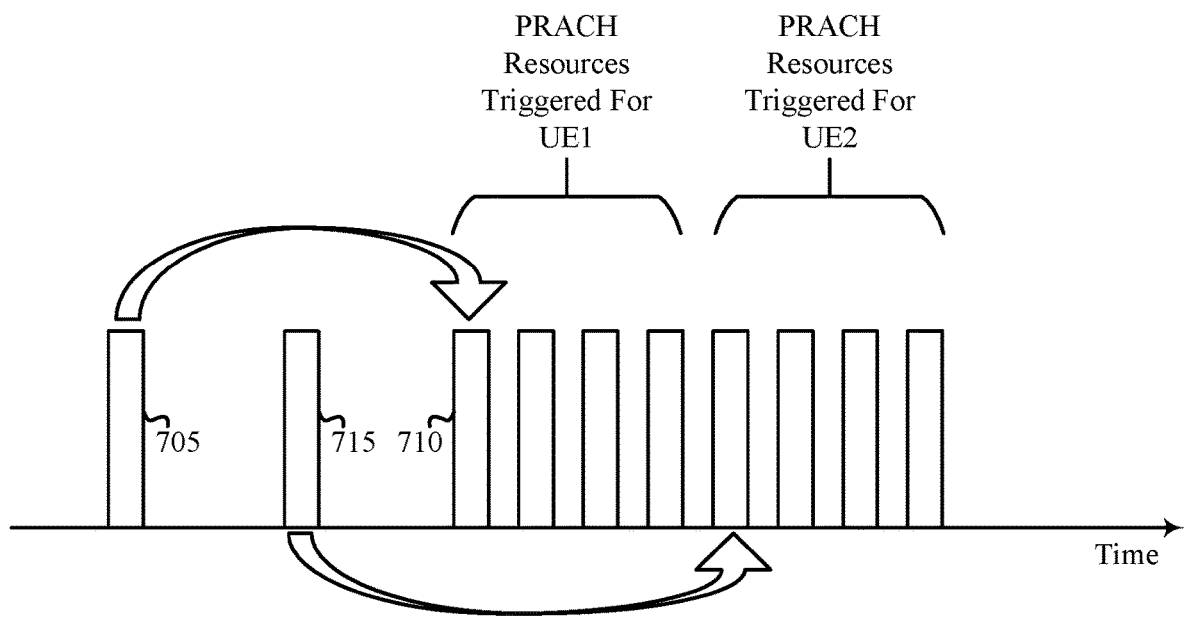
FIG. 7 illustrates an example of a timing diagram that supports triggered PRACH for NR-U in accordance with aspects of the present disclosure.

FIG. 7 illustrates an example of a timing diagram 700 that supports triggered PRACH for NR-U in accordance with aspects of the present disclosure. In some examples, timing diagram 700 may implement aspects of wireless communication system 100 and/or timing diagrams 200, 300, 400, 500, and/or 600. Aspects of timing diagram 700 may be implemented by a base station and/or a UE, which may be examples of corresponding devices described herein. In some aspects, timing diagram 700 may be implemented over a wireless channel of a licensed and/or a shared or unlicensed radio frequency spectrum band.

As discussed above, a base station may generally transmit or otherwise output for transmission a signal that configures random access parameter(s) for a wireless channel. The base station may then transmit or otherwise output for transmission a downlink control signal (e.g., a triggering DCI) that carries or conveys an indication of the trigger and/or location of triggered random access occasions 710 (e.g., triggered PRACH resources, with eight triggered PRACH resources being shown by way of example only). In some aspects, the configured parameters and/or the downlink control signal may carry or otherwise convey an indication of a timing offset, a time duration, and the like, for the triggered random access occasions 710. In some aspects, the downlink control signal may carry or otherwise convey an indication of when (e.g., the random access occasions 710) random access signal transmissions may occur. In some aspects, the downlink control signal may carry or otherwise convey a set of contention-free preambles which can be used for random access signal transmissions and orders a set of UEs to perform random access signal transmission. In some aspects, some or all of the triggered random access occasions 710 may be configured for different UEs to access. For example, a first subset of the triggered random access occasions 710 may be for a first UE (UE1), with a second subset of the triggered random access occasions 710 may be for a second UE (UE2).

In the example illustrated in timing diagram 700, multiple downlink control signals may be transmitted, with each down the control signal corresponding to a different UE. For example, a first downlink control signal 705 may be transmitted to trigger and locate the first subset of random access occasions 710 (e.g., the first 4 random access occasions 710) for UE1 and transmit a second downlink control signal 715 to trigger and locate the second set of random access occasions 710 (e.g., the last 4 random access occasions 710) for UE2. In some aspects, the first and/or second downlink control signal 705, 715 may be control signaling other than a triggering DCI. For example, the first and/or second downlink control signals 705, 715 may be other PDCCH signals (e.g., PDCCH order).

Accordingly, aspects of the described techniques support the order of the control signals (e.g., PDCCH) being used by the network to order PRACH transmissions by UE. In some aspects, the order of the PDCCH signals (e.g., the first and/or second downlink control signals 705, 715) may also indicate or otherwise correspond to a set of random access preambles to be used for the corresponding UE. In some examples and for a contention free random access procedure, the PDCCH order DCI may also be used to trigger a PRACH transmission using the triggered random access occasions 710. In some aspects, the PDCCH signal may carry or otherwise contain one, some (in any combination), or all of the random access parameters indicated in the downlink control signals. In some aspects, the PDCCH order indicates PRACH resources to be used by the UE (e.g., the triggered or RRC configured resources).

In some aspects, the UE may transmit or otherwise output a random access signal for transmission on the wireless channel during at least one of the triggered random access occasions 710. For example, UE1 may transmit or otherwise output the random access signal using the first subset of triggered random access occasions 710, whereas UE2 may transmit or otherwise output the random access signal using the second subset of triggered random access occasions 710. In some aspects, the random access signal may be transmitted according to the random access parameters (as originally configured and/or as updated by the downlink control/PDCCH signal) and/or the location of the triggered random access occasions 710 indicated in the downlink control/PDCCH signals. The base station and UE may establish a connection based at least in part on the random access signal.

Figure 8:
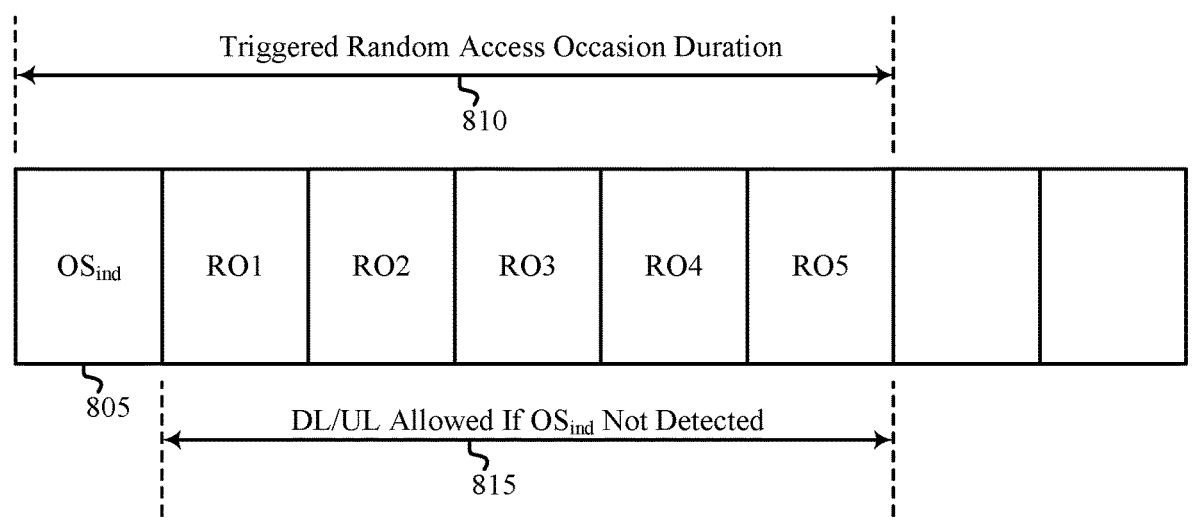
FIG. 8 illustrates an example of a timing diagram that supports triggered PRACH for NR-U in accordance with aspects of the present disclosure.

FIG. 8 illustrates an example of a timing diagram 800 that supports triggered PRACH for NR-U in accordance with aspects of the present disclosure. In some examples, timing diagram 800 may implement aspects of wireless communication system 100 and/or timing diagrams 200, 300, 400, 500, 600, and/or 700. Aspects of timing diagram 800 may be implemented by a base station and/or a UE, which may be examples of corresponding devices described herein. In some aspects, timing diagram 800 may be implemented over a wireless channel of a licensed and/or a shared or unlicensed radio frequency spectrum band.

As discussed above, a base station may generally transmit or otherwise output for transmission a signal that configures random access parameter(s) for a wireless channel. The base station may then transmit or otherwise output for transmission a downlink control signal (e.g., a triggering DCI) that carries or conveys an indication of the trigger and/or location of triggered random access occasions 805. In some aspects, the configured parameters and/or the downlink control signal may carry or otherwise convey an indication of a timing offset, a time duration 810 (e.g., the triggered random access occasion's 805 duration), and the like, for the triggered random access occasions 805. In some aspects, the downlink control signal may carry or otherwise convey an indication of when (e.g., the random access occasions 805) random access signal transmissions may occur.

As discussed above, in some aspects the downlink control signal may carry or convey an indication of a symbol occurring prior to a random access occasion in which an intent to transmit transmission will occur. In the example illustrated in timing diagram 800, the symbol may refer to the first symbol ($OS_{ind}$) corresponding to a triggered random access occasion 805. Accordingly, UE's wishing to utilize one of the other triggered random access occasions 805 (e.g., random access occasion one (RO1), RO2, RO3, etc.) may transmit or otherwise output for transmission an intent to transmit signal to the base station signaling their intent to use one of the triggered random access occasions 805 during the first symbol. In some aspects, the intent to transmit signal may carry or convey an indication of which triggered random access occasion 805 that the UE intends to use for transmitting a random access occasion. Accordingly, the base station may monitor for the intent to transmit signal from UEs during the first symbol and, if detected, monitor the identified triggered random access occasion 805 within the time period 815 to receive the random access signal from the UE. However, in some examples the base station may not detect the intent to transmit a signal from the UEs during the first symbol and, instead, utilize the symbols occurring during the time period 815 to perform uplink and/or downlink transmissions. That is, the base station may reuse the triggered random access occasions 805 when no intent to transmit signal is detected from the UE during the first symbol.

Accordingly, this may allow the base station to reclaim and reschedule unused triggered random access occasions 805. The base station may determine that the triggered random access occasions 805 are unused by reserving a symbol before longer dynamic triggered random access occasions 805 that all interested UEs would use for transmitting the intent to transmit signal, before transmitting the actual random access signal (e.g., Msg1) transmission. If the base station detects the intent to transmit signal in the symbol, it will not reclaim the triggered random access occasions 805 for uplink and/or downlink transmissions. If not, the base station may reclaim the unused triggered random access occasions 805 for uplink and/or downlink transmissions.

In some aspects, the UE may transmit or otherwise output, based on an intent to transmit signal transmitted during the first symbol, a random access signal for transmission on the wireless channel during at least one of the triggered random access occasions 805. In some aspects, the random access signal may be transmitted according to the random access parameters (as originally configured and/or as updated by the downlink control signal) and/or the location of the triggered random access occasions 805 indicated in the downlink control signals. The base station and UE may establish a connection based at least in part on the random access signal.

Figure 9:
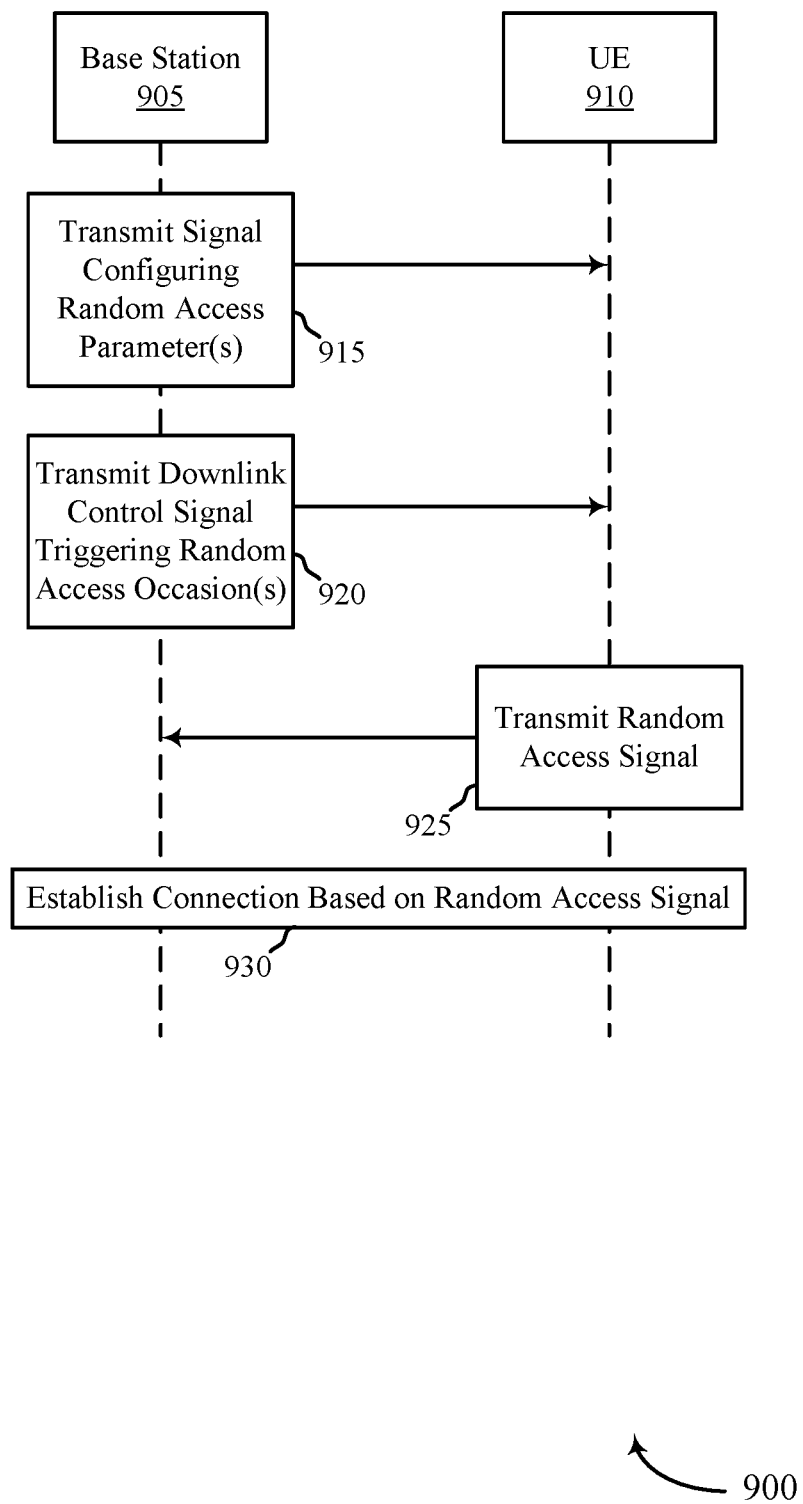
FIG. 9 illustrates an example of a process that supports triggered PRACH for NR-U in accordance with aspects of the present disclosure.

FIG. 9 illustrates an example of a process 900 that supports triggered PRACH for NR-U in accordance with aspects of the present disclosure. In some examples, process 900 may implement aspects of wireless communication system 100 and/or timing diagrams 200, 300, 400, 500, 600, 700, and/or 800. Aspects of process 900 may be implemented by base station 905 and/or UE 910, which may be examples of corresponding devices described herein. In some aspects, process 900 may be implemented over a wireless channel of a licensed and/or a shared or unlicensed radio frequency spectrum band.

At 915, base station 905 may transmit or otherwise output for transmission (and UE 910 may receive or otherwise obtain) a signal over a wireless channel that configures random access parameter(s) for the wireless channel. In some aspects, the signal may carry or convey an indication of where UE 910 is to monitor to receive a downlink control signal triggering random access occasion(s), e.g., a control resource set, a search space, and the like. In some aspects, the signal may include, but is not limited to, RRC signaling, system information signaling (e.g., RMSI signaling), and the like.

In some aspects, the configured random access parameters may include, but are not limited to, a waveform configuration for the random access signal, a format for the random access signal, a time/frequency/spatial resource for the random access signal, a repetition factor for a pattern of the random access occasion(s), a preamble configuration for the random access signal, and the like.

At 920, base station 905 may transmit or otherwise output for transmission (and UE 910 may receive or otherwise obtain) a downlink control signal over the wireless channel that carries or conveys an indication of a trigger and/or location of one or more random access occasions for the UE. In some aspects, the downlink control signal may be a PDCCH signal, a DCI, and the like. In some aspects, the downlink control signal may carry or convey an indication of updated random access parameters to be used for the random access signal transmission.

In some aspects, the downlink control signal may identify different subsets of the triggered random access occasions, e.g., different subsets associated with different UEs, associated with different SSB resources, and the like. In some aspects, the downlink control signal may carry or convey an indication of a timing offset for the triggered random access occasions (e.g., relative to the receipt of the downlink control signal and/or relative to a reference point configured by the network).

At 925, UE 910 may transmit or otherwise output for transmission (and base station 905 may receive or otherwise obtain) a random access signal on the wireless channel during at least one of the triggered random access occasions. In some aspects, the random access signal may be communicated according to the configured (or updated) random access parameters and location indicated in the downlink control signal. In some aspects, the random access signal may comprise a random access preamble, such as a RACH preamble or Msg1 transmission.

Accordingly and at 930, base station 905 and UE 910 may establish a connection based on the random access signal. For example, base station 905 and UE 910 may perform a random access procedure (e.g., a RACH procedure) where one or more random access signals are exchanged in order to establish a connection. In some aspects, the established connection may be an initial access connection and/or may be a handover-based connection, e.g., due to UE 910 mobility.

Figure 10:
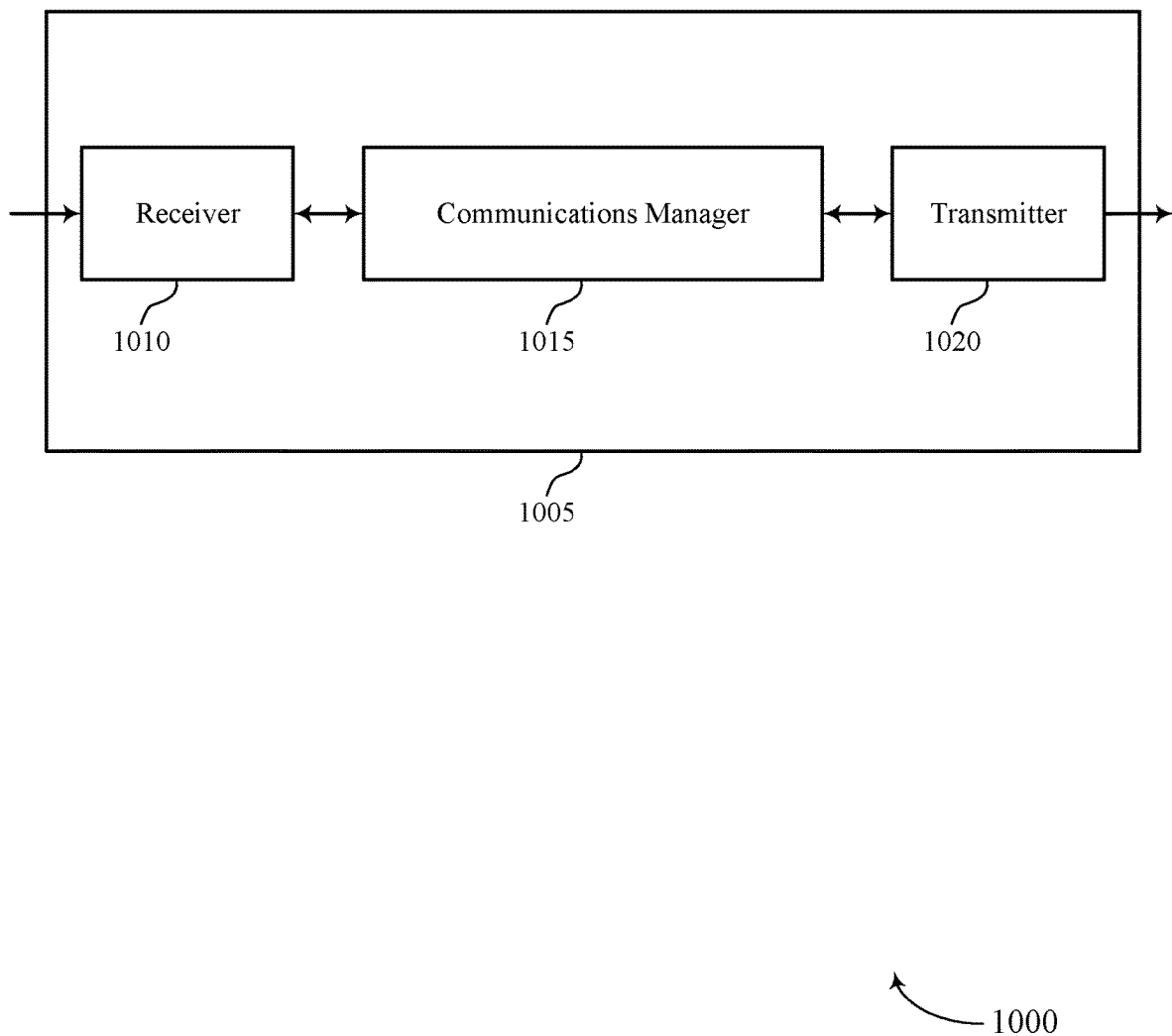
FIGS. 10 and 11 show block diagrams of devices that support triggered PRACH for NR-U in accordance with aspects of the present disclosure.

FIG. 10 shows a block diagram 1000 of a device 1005 that supports triggered PRACH for NR-U in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to triggered PRACH for NR-U, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may obtain a signal received over a wireless channel, the signal configuring one or more random access parameters for the wireless channel, obtain a downlink control signal over the wireless channel, where the downlink control signal includes an indication of a trigger and a location of one or more random access occasions for the UE, output, based on the downlink control signal, a random access signal for transmission on the wireless channel during at least one of the one or more random access occasions and according to the one or more random access parameters and the location, and establish a connection with a base station based on the random access signal. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
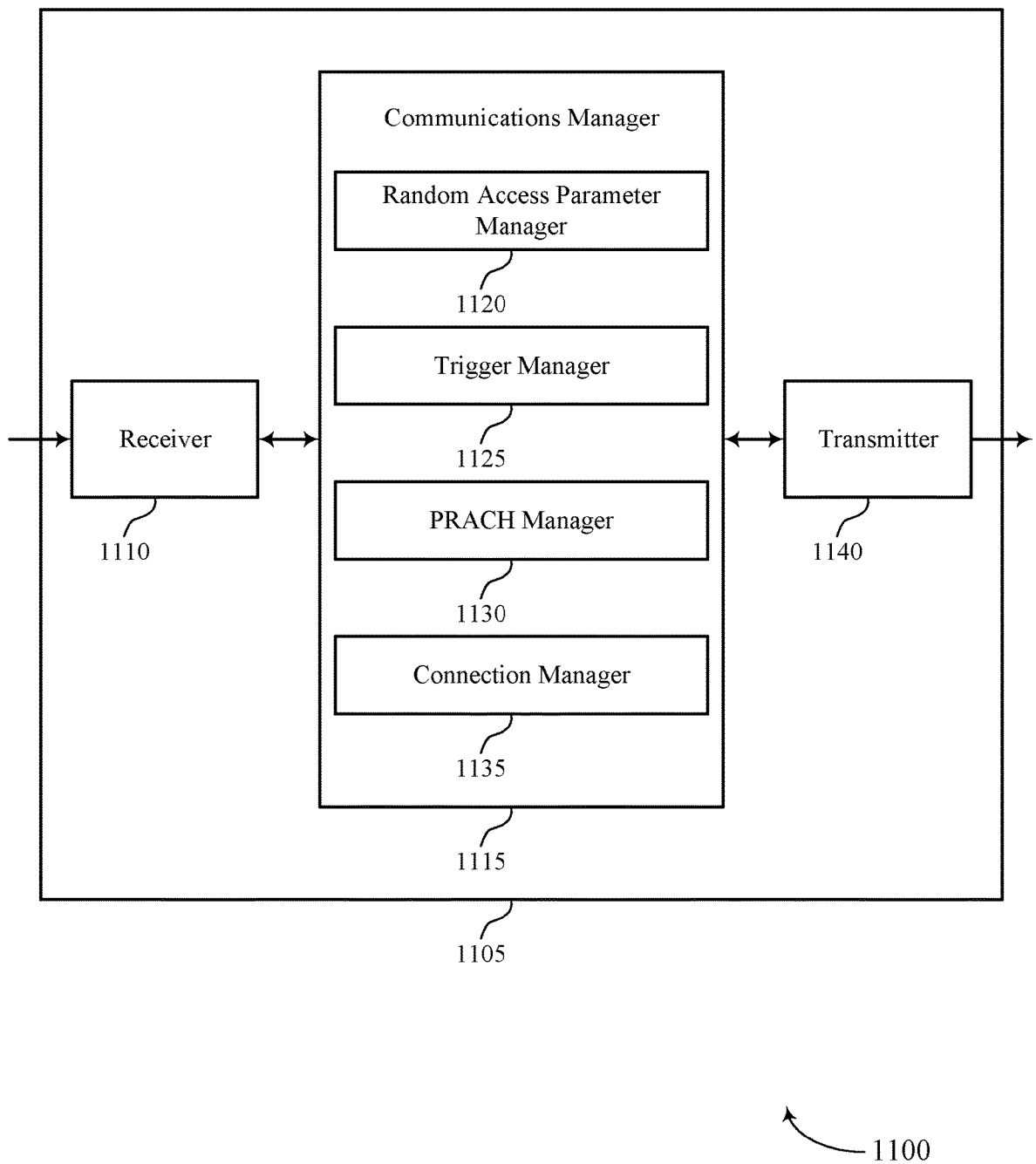

FIG. 11 shows a block diagram 1100 of a device 1105 that supports triggered PRACH for NR-U in accordance with aspects of the present disclosure. The device 1105 may be an example of aspects of a device 1005, or a UE 115 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to triggered PRACH for NR-U, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a random access parameter manager 1120, a trigger manager 1125, a PRACH manager 1130, and a connection manager 1135. The communications manager 1115 may be an example of aspects of the communications manager 1310 described herein.

The random access parameter manager 1120 may obtain a signal received over a wireless channel, the signal configuring one or more random access parameters for the wireless channel.

The trigger manager 1125 may obtain a downlink control signal over the wireless channel, where the downlink control signal includes an indication of a trigger and a location of one or more random access occasions for the UE.

The PRACH manager 1130 may output, based on the downlink control signal, a random access signal for transmission on the wireless channel during at least one of the one or more random access occasions and according to the one or more random access parameters and the location.

The connection manager 1135 may establish a connection with a base station based on the random access signal.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
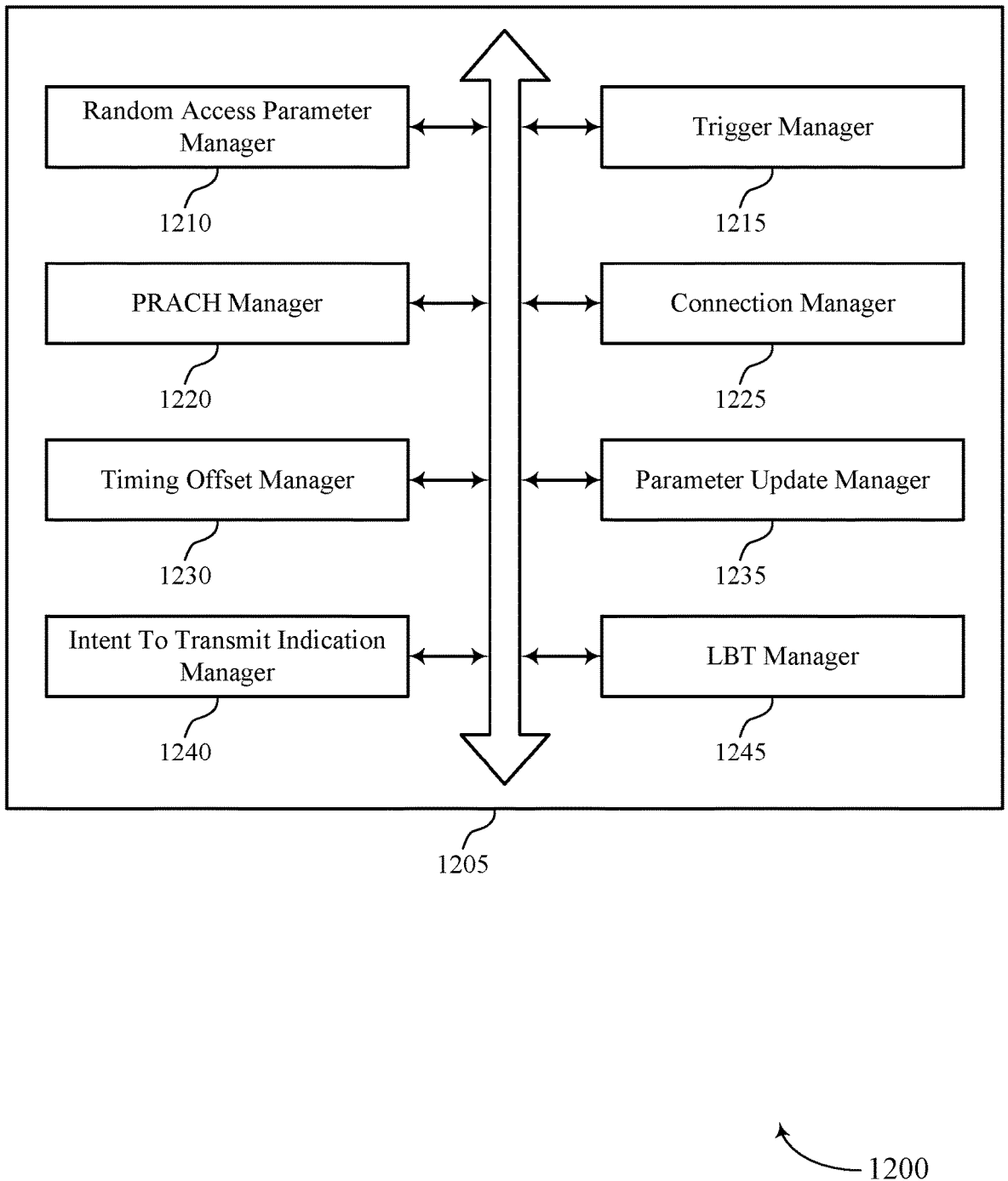
FIG. 12 shows a block diagram of a communications manager that supports triggered PRACH for NR-U in accordance with aspects of the present disclosure.

FIG. 12 shows a block diagram 1200 of a communications manager 1205 that supports triggered PRACH for NR-U in accordance with aspects of the present disclosure. The communications manager 1205 may be an example of aspects of a communications manager 1015, a communications manager 1115, or a communications manager 1310 described herein. The communications manager 1205 may include a random access parameter manager 1210, a trigger manager 1215, a PRACH manager 1220, a connection manager 1225, a timing offset manager 1230, a parameter update manager 1235, an intent to transmit indication manager 1240, and a LBT manager 1245. Each of these modules may communicate, directly or indirectly, with one another (e.g., via one or more buses).

The random access parameter manager 1210 may obtain a signal received over a wireless channel, the signal configuring one or more random access parameters for the wireless channel. In some cases, the one or more random access parameters include at least one of a random access signal waveform configuration, a format for the random access signal, a time-frequency resource for the random access signal, a repetition factor for a pattern of one or more random access occasions, a preamble configuration for the random access signal, a timing advance for the random access signal, an indication of one or more symbols occurring prior to a random access occasion in which an intent to transmit transmission will occur, a first timing offset for a random access occasion relative to the downlink control signal, a second timing offset for a random access occasion relative to a reference point indicated by a network, a time duration in which the one or more random access occasions are triggered, a LBT configuration associated with one or more random access occasions, or a combination thereof.

In some cases, the signal configuring the one or more random access parameters includes an indication of at least one of a control resource set, a search space configuration, a downlink control signal format, or a combination thereof, for obtaining the downlink control signal. In some cases, the signal configuring the one or more random access parameters includes at least one of a radio resource control signal, a system information signal, or a combination thereof.

The trigger manager 1215 may obtain a downlink control signal over the wireless channel, where the downlink control signal includes an indication of a trigger and a location of one or more random access occasions for the UE. In some cases, the downlink control signal includes at least one of a first timing offset for a random access occasion relative to the downlink control signal, a second timing offset for a random access occasion relative to a reference point indicated by a network, a time-frequency resource for the random access signal, an index value corresponding to a time-frequency resource for the random access signal, a preamble configuration for the random access signal, a time duration in which the one or more random access occasions are triggered, a configuration to map one or more synchronization signal blocks to one or more random access occasions and random access preambles, an indication of a subset of the one or more random access occasions, an indication of a symbol occurring prior to a random access occasion in which an intent to transmit transmission will occur, a LBT configuration associated with one or more random access occasions, or a combination thereof.

The PRACH manager 1220 may output, based on the downlink control signal, a random access signal for transmission on the wireless channel during at least one of the one or more random access occasions and according to the one or more random access parameters and the location. In some examples, the PRACH manager 1220 may perform, based on the random access signal, an outputting of the random access signal for transmission.

The connection manager 1225 may establish a connection with a base station based on the random access signal.

The timing offset manager 1230 may identify, based on the downlink control signal, a timing offset between a reference point and a time instance where random access occasions are triggered, where the reference point is either a reception of the downlink control signal or is a network-configured via common control signaling reference point.

The parameter update manager 1235 may update at least one of the one or more random access parameters based on the downlink control signal.

The intent to transmit indication manager 1240 may output, for transmission to the base station, an indication of intent to transmit the random access signal during the at least one of the one or more random access occasions, where the indication of intent to transmit the random access signal is output for transmission prior to the one or more random access occasions used for transmission of the random access signal.

The LBT manager 1245 may initiate a listen-before-talk procedure prior to outputting the random access signal for transmission.

Figure 13:
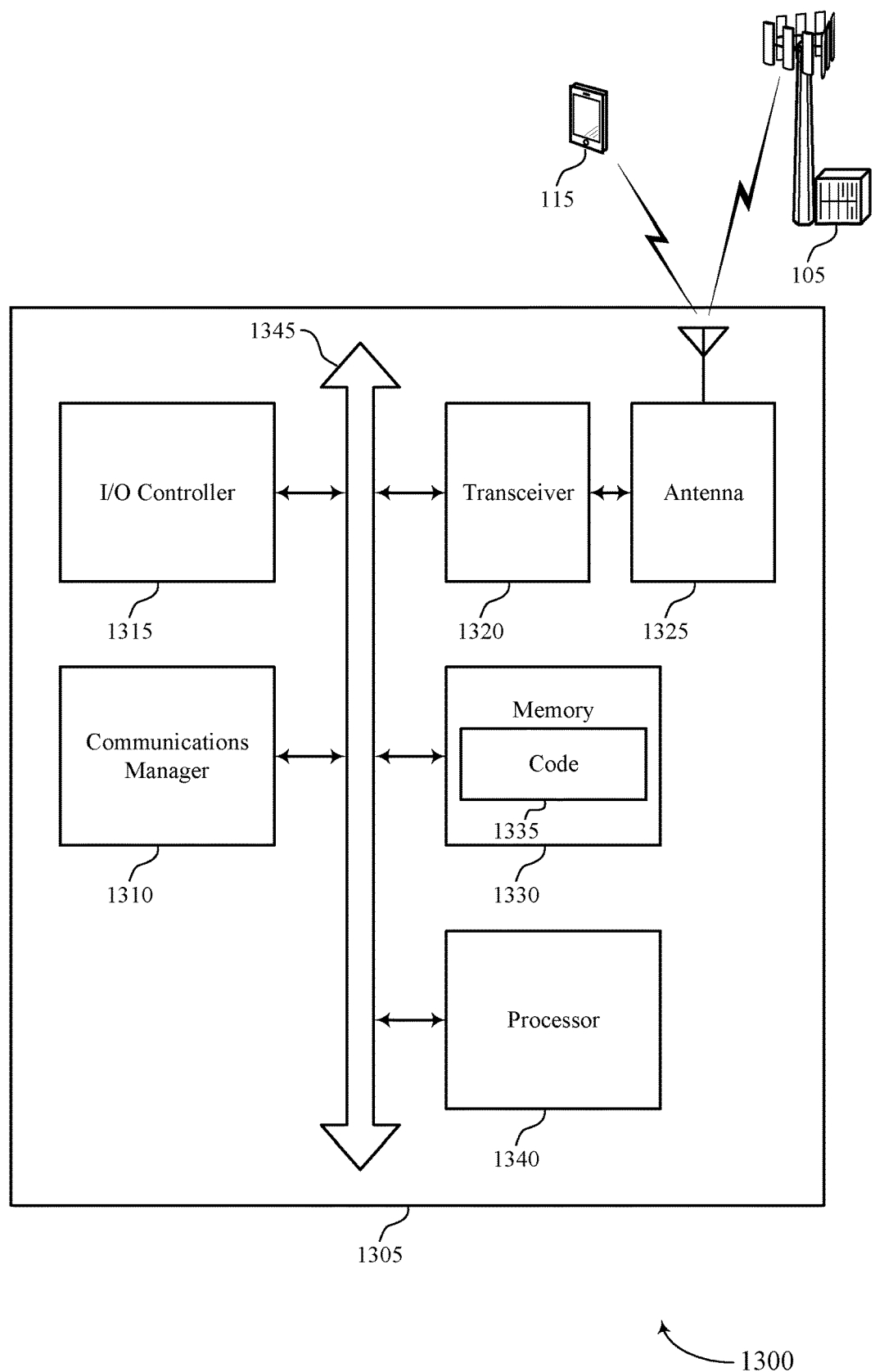
FIG. 13 shows a diagram of a system including a device that supports triggered PRACH for NR-U in accordance with aspects of the present disclosure.

FIG. 13 shows a diagram of a system 1300 including a device 1305 that supports triggered PRACH for NR-U in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may obtain a signal received over a wireless channel, the signal configuring one or more random access parameters for the wireless channel, obtain a downlink control signal over the wireless channel, where the downlink control signal includes an indication of a trigger and a location of one or more random access occasions for the UE, output, based on the downlink control signal, a random access signal for transmission on the wireless channel during at least one of the one or more random access occasions and according to the one or more random access parameters and the location, and establish a connection with a base station based on the random access signal.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting triggered PRACH for NR-U).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
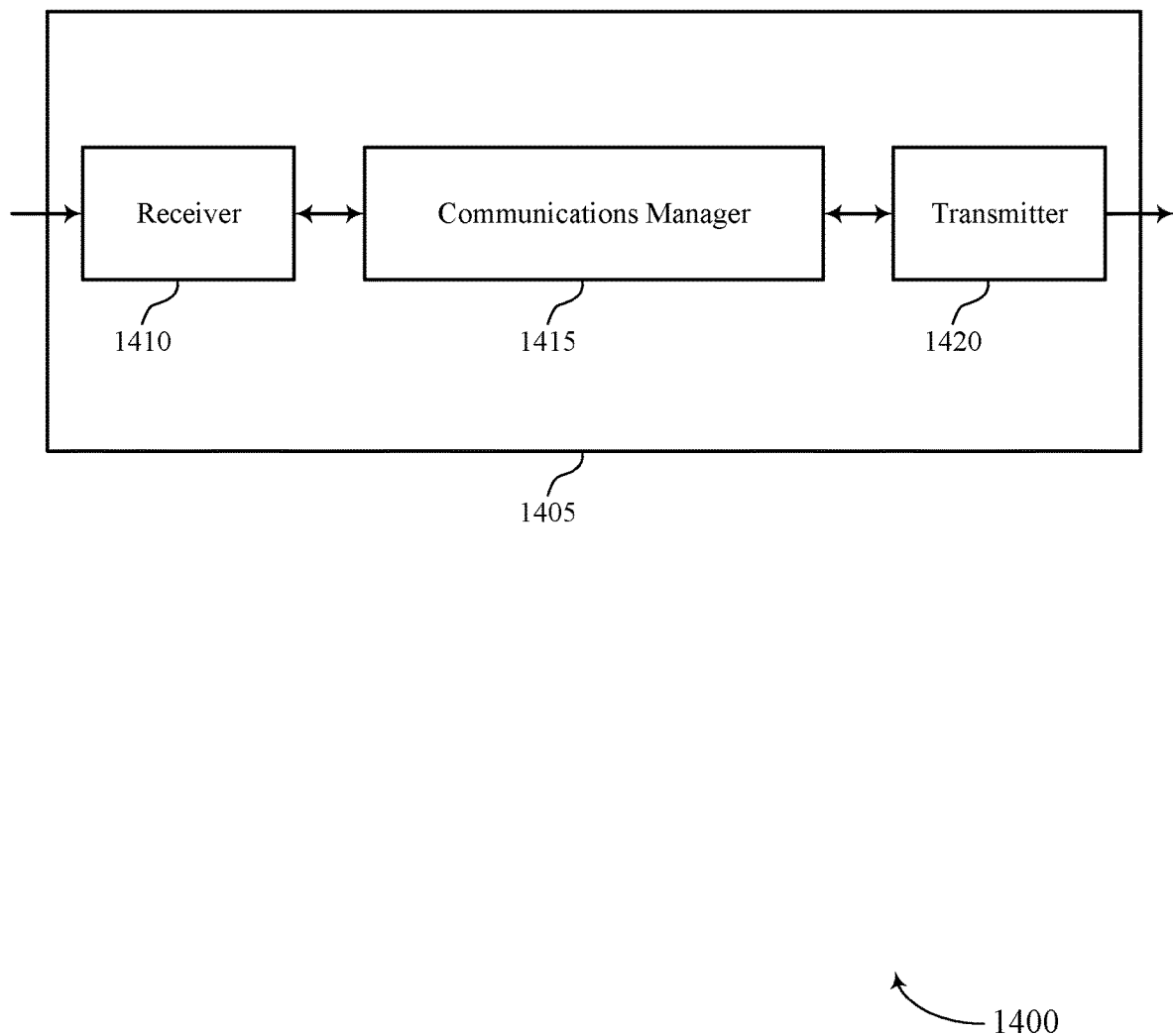
FIGS. 14 and 15 show block diagrams of devices that support triggered PRACH for NR-U in accordance with aspects of the present disclosure.

FIG. 14 shows a block diagram 1400 of a device 1405 that supports triggered PRACH for NR-U in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to triggered PRACH for NR-U, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may output a signal for transmission over a wireless channel, the signal configuring one or more random access parameters for the wireless channel, output a downlink control signal for transmission over the wireless channel, where the downlink control signal includes an indication of a trigger and a location of one or more random access occasions for a UE, obtain, based on the downlink control signal, a random access signal received over the wireless channel during at least one of the one or more random access occasions and according to the one or more random access parameters and the location, and establish a connection with the UE based on the random access signal. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
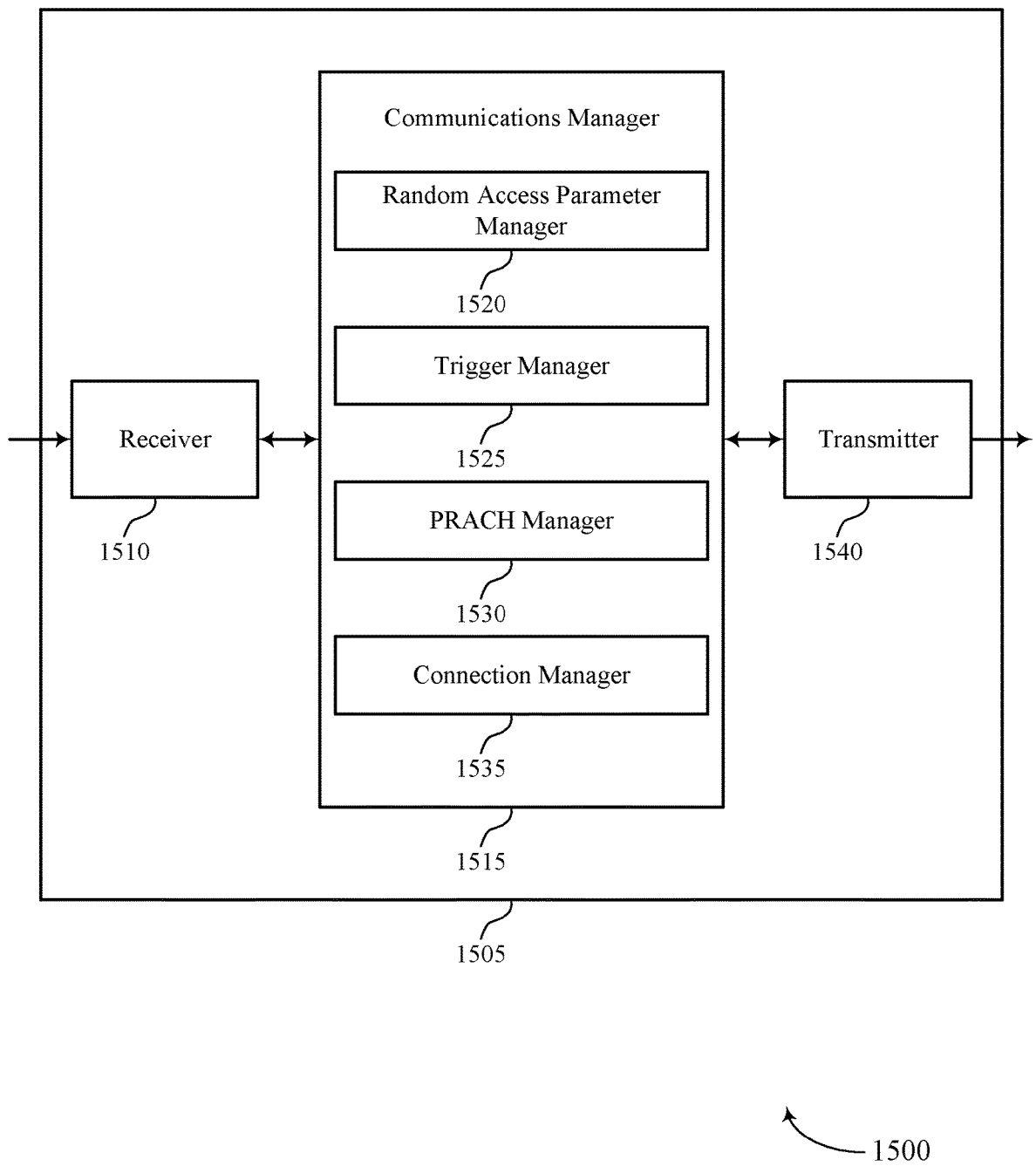

FIG. 15 shows a block diagram 1500 of a device 1505 that supports triggered PRACH for NR-U in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to triggered PRACH for NR-U, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a random access parameter manager 1520, a trigger manager 1525, a PRACH manager 1530, and a connection manager 1535. The communications manager 1515 may be an example of aspects of the communications manager 1710 described herein.

The random access parameter manager 1520 may output a signal for transmission over a wireless channel, the signal configuring one or more random access parameters for the wireless channel.

The trigger manager 1525 may output a downlink control signal for transmission over the wireless channel, where the downlink control signal includes an indication of a trigger and a location of one or more random access occasions for a UE.

The PRACH manager 1530 may obtain, based on the downlink control signal, a random access signal received over the wireless channel during at least one of the one or more random access occasions and according to the one or more random access parameters and the location.

The connection manager 1535 may establish a connection with the UE based on the random access signal.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
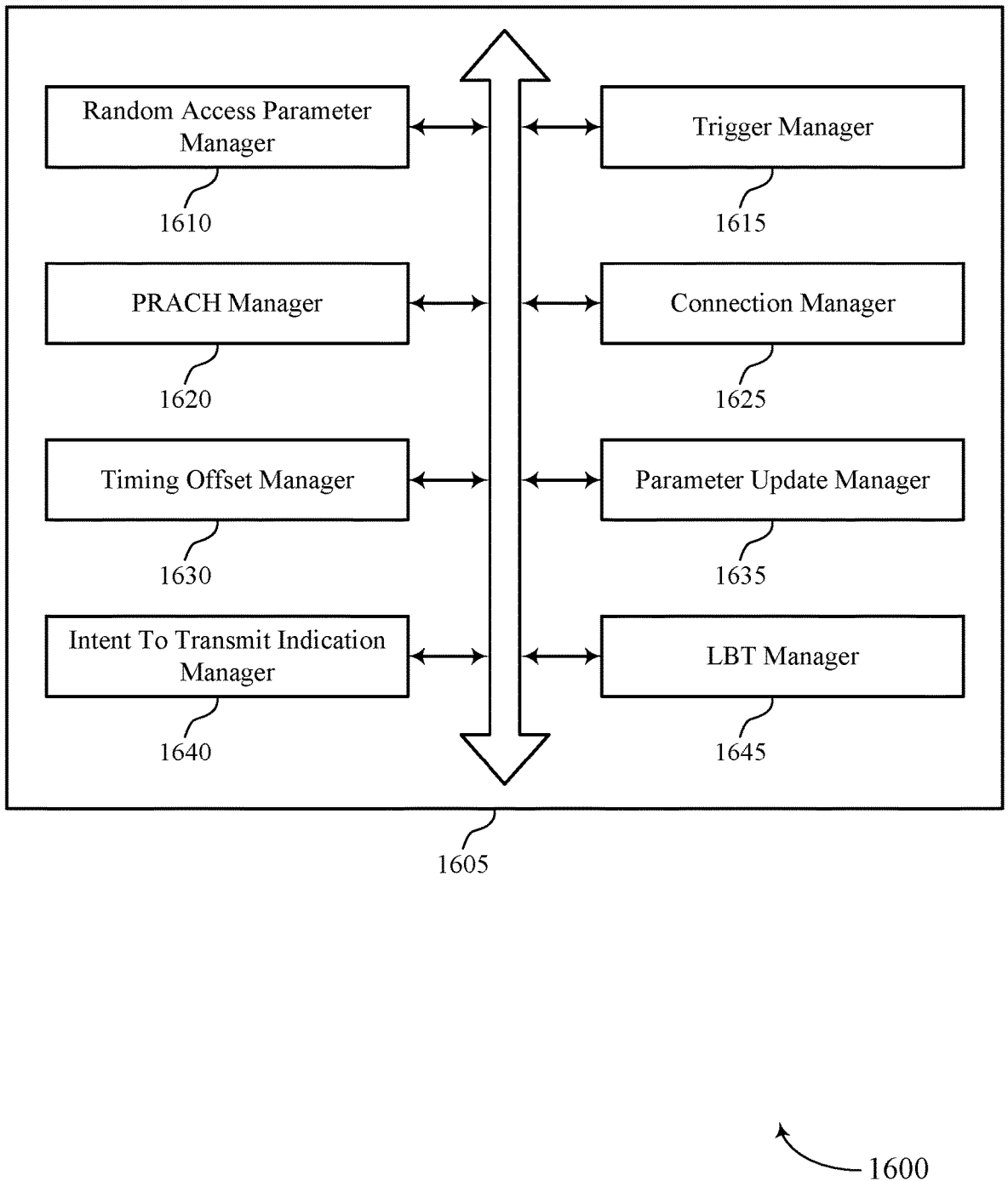
FIG. 16 shows a block diagram of a communications manager that supports triggered PRACH for NR-U in accordance with aspects of the present disclosure.

FIG. 16 shows a block diagram 1600 of a communications manager 1605 that supports triggered PRACH for NR-U in accordance with aspects of the present disclosure. The communications manager 1605 may be an example of aspects of a communications manager 1415, a communications manager 1515, or a communications manager 1710 described herein. The communications manager 1605 may include a random access parameter manager 1610, a trigger manager 1615, a PRACH manager 1620, a connection manager 1625, a timing offset manager 1630, a parameter update manager 1635, an intent to transmit indication manager 1640, and a LBT manager 1645. Each of these modules may communicate, directly or indirectly, with one another (e.g., via one or more buses).

The random access parameter manager 1610 may output a signal for transmission over a wireless channel, the signal configuring one or more random access parameters for the wireless channel. In some cases, the one or more random access parameters include at least one of a random access signal waveform configuration, a format for the random access signal, a time-frequency resource for the random access signal, a repetition factor for a pattern of one or more random access occasions, a preamble configuration for the random access signal, a timing advance for the random access signal, an indication of a symbol occurring prior to a random access occasion in which an intent to transmit transmission will occur, a first timing offset for a random access occasion relative to the downlink control signal, a second timing offset for a random access occasion relative to a reference point indicated by a network, a time duration in which the one or more random access occasions are triggered, a LBT configuration associated with one or more random access occasions, or a combination thereof.

In some cases, the signal configuring the one or more random access parameters includes an indication of at least one of a control resource set, a search space configuration, a downlink control signal format, or a combination thereof, for obtaining the downlink control signal. In some cases, the signal configuring the one or more random access parameters includes at least one of a radio resource control signal, a system information signal, or a combination thereof.

The trigger manager 1615 may output a downlink control signal for transmission over the wireless channel, where the downlink control signal includes an indication of a trigger and a location of one or more random access occasions for a UE. In some cases, the downlink control signal is associated with a subset of the one or more random access occasions and a corresponding subset of random access preambles.

In some cases, the downlink control signal includes at least one of a first timing offset for a random access occasion relative to the downlink control signal, a second timing offset for a random access occasion relative to a reference point indicated by a network, a time-frequency resource for the random access signal, an index value corresponding to a time-frequency resource for the random access signal, a preamble configuration for the random access signal, a time duration in which the one or more random access occasions are triggered, a configuration to map one or more synchronization signal blocks to one or more random access occasions and random access preambles, an indication of a subset of the one or more random access occasions, an indication of a symbol occurring prior to a random access occasion in which an intent to transmit transmission will occur, a LBT configuration associated with one or more random access occasions, or a combination thereof.

The PRACH manager 1620 may obtain, based on the downlink control signal, a random access signal received over the wireless channel during at least one of the one or more random access occasions and according to the one or more random access parameters and the location.

The connection manager 1625 may establish a connection with the UE based on the random access signal.

The timing offset manager 1630 may configure the downlink control signal to indicate a timing offset between a reference point and a time instance when random access occasions are triggered, where the reference point is either the transmission of the downlink control signal or is a network-configured via common control signaling reference point.

The parameter update manager 1635 may configure the downlink control signal to indicate an update for at least one of the one or more random access parameters.

The intent to transmit indication manager 1640 may obtain, prior to obtaining the random access signal, an indication of intent to transmit the random access signal during the at least one of the one or more random access occasions, where the indication of intent to transmit the random access signal is obtained prior to the one or more random access occasions used for transmission of the random access signal.

The LBT manager 1645 may initiate a listen-before-talk procedure prior to outputting at least one of the signal, the downlink control signal, or a combination thereof, for transmission.

Figure 17:
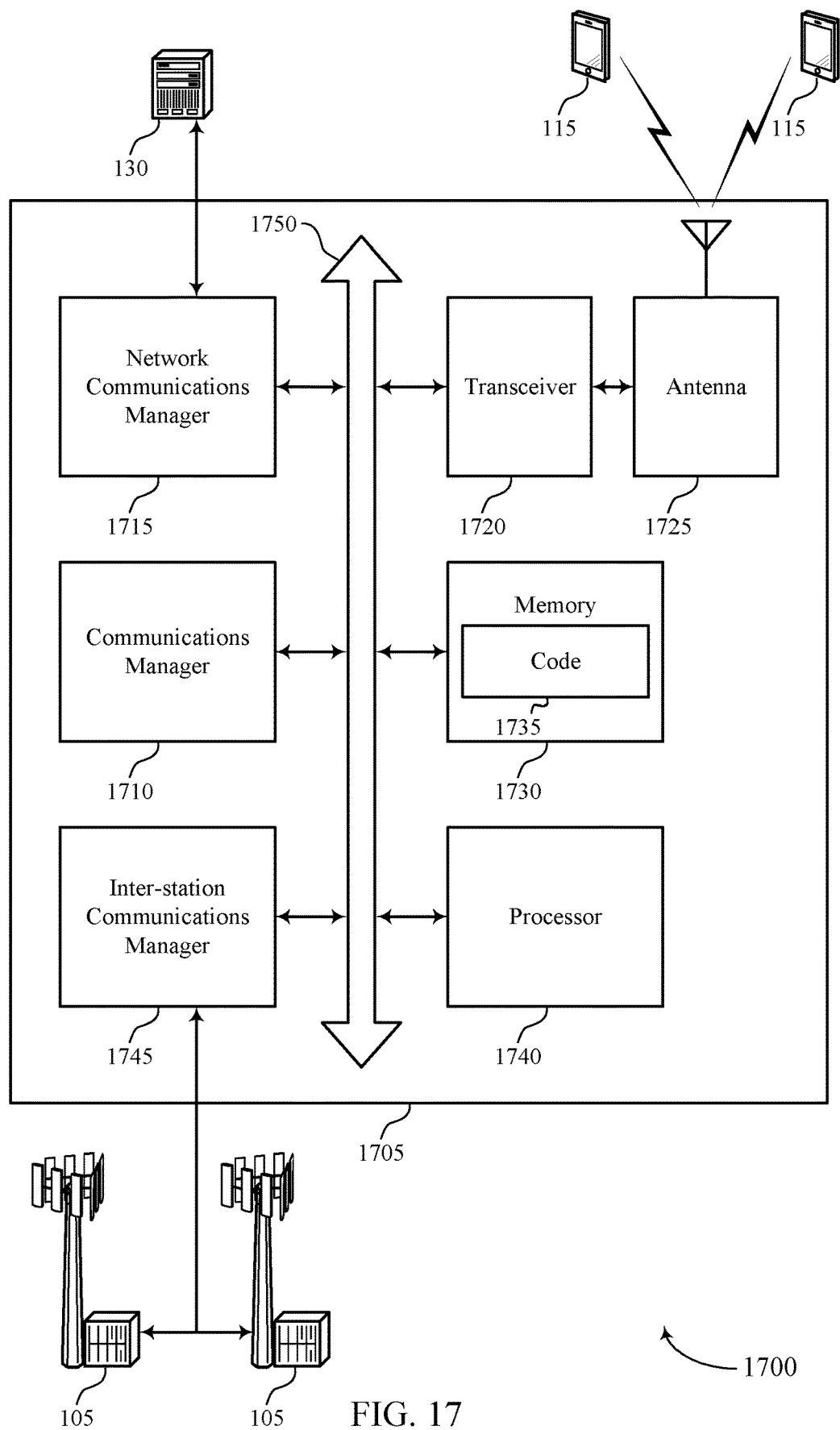
FIG. 17 shows a diagram of a system including a device that supports triggered PRACH for NR-U in accordance with aspects of the present disclosure.

FIG. 17 shows a diagram of a system 1700 including a device 1705 that supports triggered PRACH for NR-U in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may output a signal for transmission over a wireless channel, the signal configuring one or more random access parameters for the wireless channel, output a downlink control signal for transmission over the wireless channel, where the downlink control signal includes an indication of a trigger and a location of one or more random access occasions for a UE, obtain, based on the downlink control signal, a random access signal received over the wireless channel during at least one of the one or more random access occasions and according to the one or more random access parameters and the location, and establish a connection with the UE based on the random access signal.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting triggered PRACH for NR-U).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
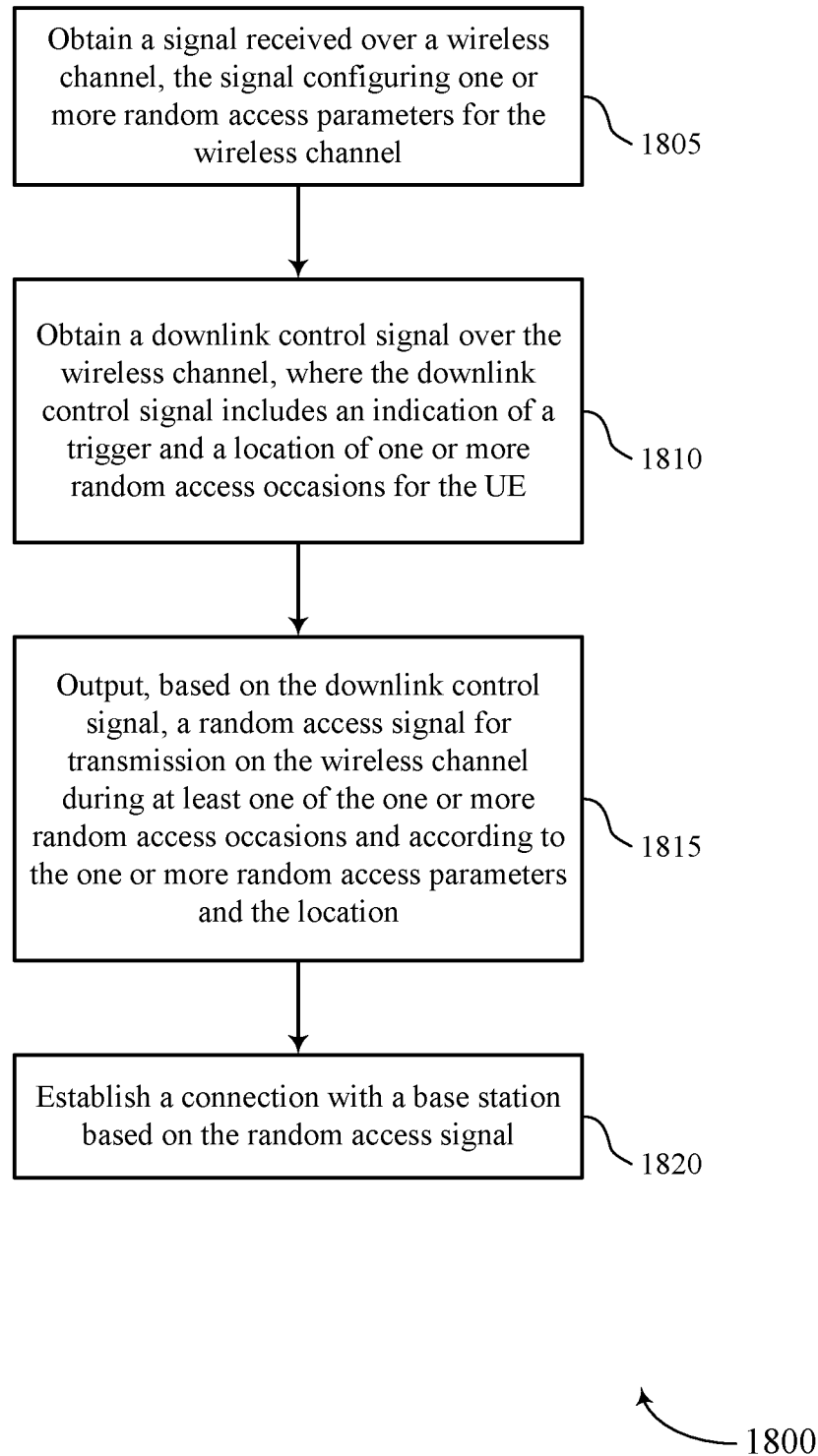
FIGS. 18 through 20 show flowcharts illustrating methods that support triggered PRACH for NR-U in accordance with aspects of the present disclosure.

FIG. 18 shows a flowchart illustrating a method 1800 that supports triggered PRACH for NR-U in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may obtain a signal received over a wireless channel, the signal configuring one or more random access parameters for the wireless channel. The operations of 1805 may be performed according to the methods described herein. In some examples, aspects of the operations of 1805 may be performed by a random access parameter manager as described with reference to FIGS. 10 through 13.

At 1810, the UE may obtain a downlink control signal over the wireless channel, where the downlink control signal includes an indication of a trigger and a location of one or more random access occasions for the UE. The operations of 1810 may be performed according to the methods described herein. In some examples, aspects of the operations of 1810 may be performed by a trigger manager as described with reference to FIGS. 10 through 13.

At 1815, the UE may output, based on the downlink control signal, a random access signal for transmission on the wireless channel during at least one of the one or more random access occasions and according to the one or more random access parameters and the location. The operations of 1815 may be performed according to the methods described herein. In some examples, aspects of the operations of 1815 may be performed by a PRACH manager as described with reference to FIGS. 10 through 13.

At 1820, the UE may establish a connection with a base station based on the random access signal. The operations of 1820 may be performed according to the methods described herein. In some examples, aspects of the operations of 1820 may be performed by a connection manager as described with reference to FIGS. 10 through 13.

Figure 19:
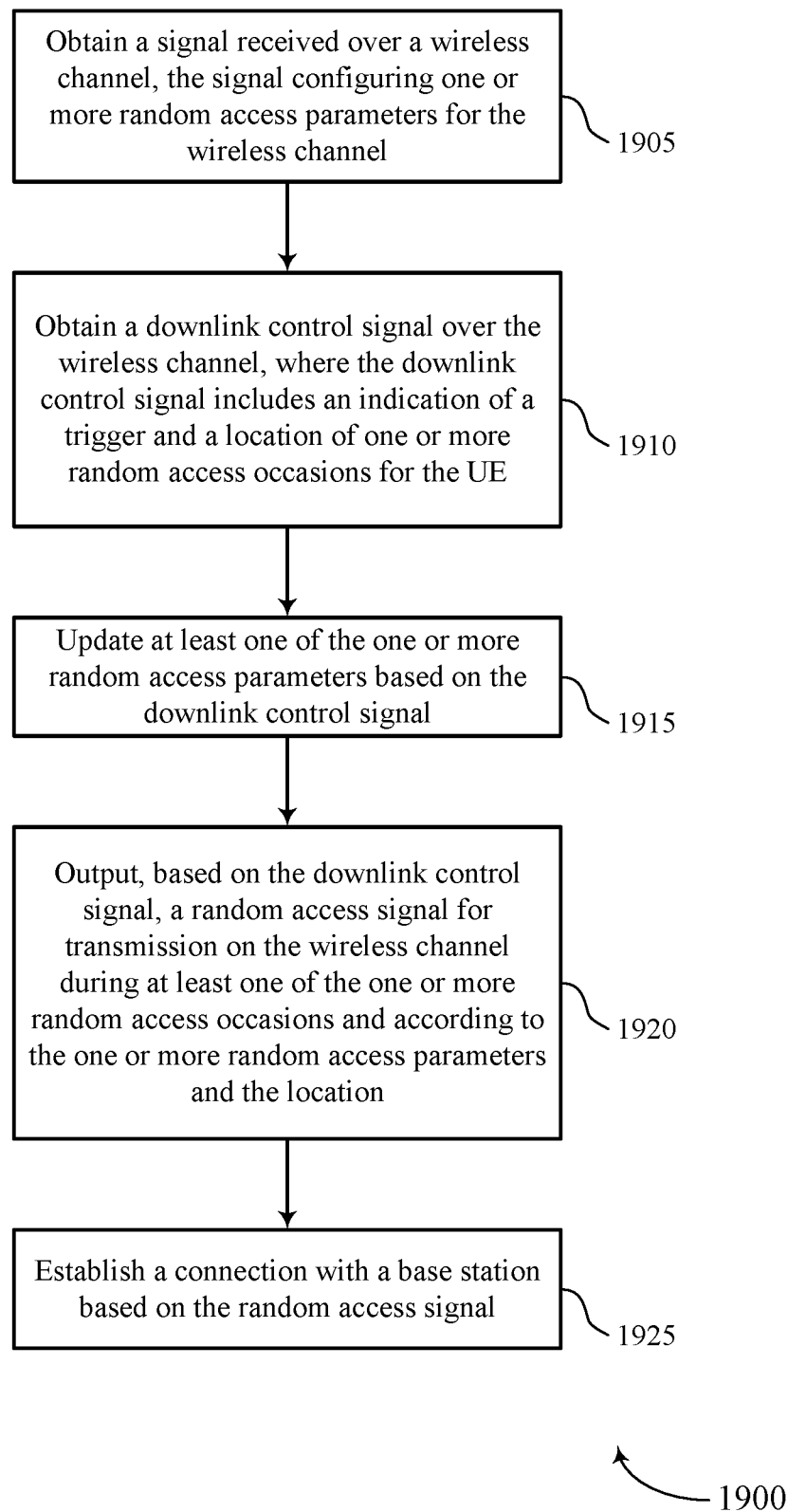

FIG. 19 shows a flowchart illustrating a method 1900 that supports triggered PRACH for NR-U in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may obtain a signal received over a wireless channel, the signal configuring one or more random access parameters for the wireless channel. The operations of 1905 may be performed according to the methods described herein. In some examples, aspects of the operations of 1905 may be performed by a random access parameter manager as described with reference to FIGS. 10 through 13.

At 1910, the UE may obtain a downlink control signal over the wireless channel, where the downlink control signal includes an indication of a trigger and a location of one or more random access occasions for the UE. The operations of 1910 may be performed according to the methods described herein. In some examples, aspects of the operations of 1910 may be performed by a trigger manager as described with reference to FIGS. 10 through 13.

At 1915, the UE may update at least one of the one or more random access parameters based on the downlink control signal. The operations of 1915 may be performed according to the methods described herein. In some examples, aspects of the operations of 1915 may be performed by a parameter update manager as described with reference to FIGS. 10 through 13.

At 1920, the UE may output, based on the downlink control signal, a random access signal for transmission on the wireless channel during at least one of the one or more random access occasions and according to the one or more random access parameters and the location. The operations of 1920 may be performed according to the methods described herein. In some examples, aspects of the operations of 1920 may be performed by a PRACH manager as described with reference to FIGS. 10 through 13.

At 1925, the UE may establish a connection with a base station based on the random access signal. The operations of 1925 may be performed according to the methods described herein. In some examples, aspects of the operations of 1925 may be performed by a connection manager as described with reference to FIGS. 10 through 13.

Figure 20:
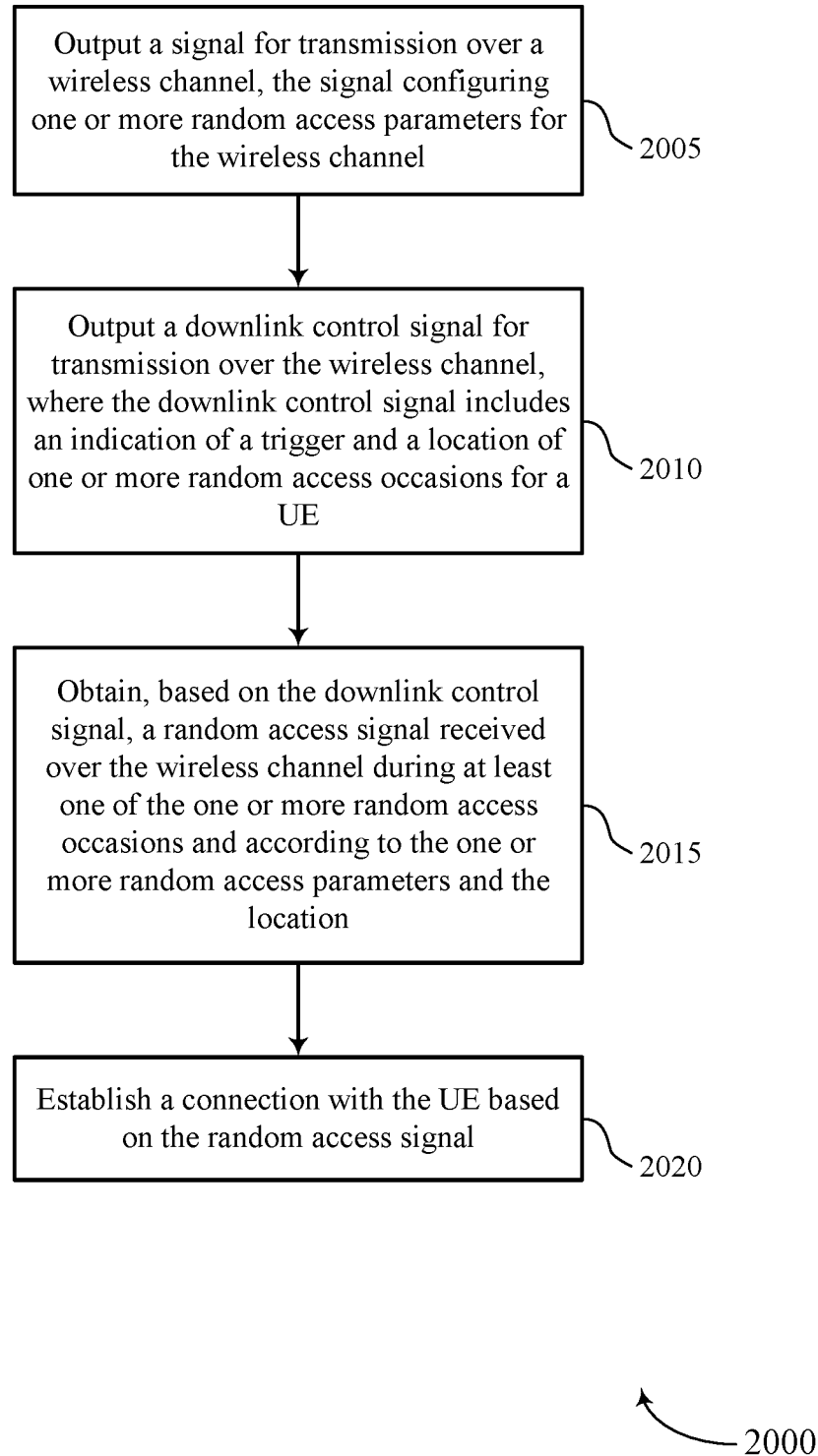

FIG. 20 shows a flowchart illustrating a method 2000 that supports triggered PRACH for NR-U in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may output a signal for transmission over a wireless channel, the signal configuring one or more random access parameters for the wireless channel. The operations of 2005 may be performed according to the methods described herein. In some examples, aspects of the operations of 2005 may be performed by a random access parameter manager as described with reference to FIGS. 14 through 17.

At 2010, the base station may output a downlink control signal for transmission over the wireless channel, where the downlink control signal includes an indication of a trigger and a location of one or more random access occasions for a UE. The operations of 2010 may be performed according to the methods described herein. In some examples, aspects of the operations of 2010 may be performed by a trigger manager as described with reference to FIGS. 14 through 17.

At 2015, the base station may obtain, based on the downlink control signal, a random access signal received over the wireless channel during at least one of the one or more random access occasions and according to the one or more random access parameters and the location. The operations of 2015 may be performed according to the methods described herein. In some examples, aspects of the operations of 2015 may be performed by a PRACH manager as described with reference to FIGS. 14 through 17.

At 2020, the base station may establish a connection with the UE based on the random access signal. The operations of 2020 may be performed according to the methods described herein. In some examples, aspects of the operations of 2020 may be performed by a connection manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   obtaining a signal received over a wireless channel, the signal configuring one or more random access parameters for the wireless channel;
   obtaining a downlink control signal over the wireless channel, wherein the downlink control signal comprises an indication of a resource location of a plurality of random access occasions for the UE and a trigger for the plurality of random access occasions;
   outputting, based at least in part on the downlink control signal, a random access signal for transmission on the wireless channel during at least one of the plurality of random access occasions and according to the one or more random access parameters and the resource location;
   outputting, for transmission to a network device, an indication of intent to transmit the random access signal during the at least one of the plurality of random access occasions, wherein the indication of intent to transmit the random access signal is output for transmission prior to the plurality of random access occasions used for transmission of the random access signal and the indication of intent indicates to the network device to refrain from reclaiming or rescheduling the at least one of the plurality of random access occasions; and
   establishing a connection with the network device based at least in part on the random access signal.

2. The method of claim 1, further comprising:
   identifying, based at least in part on the downlink control signal, a timing offset between a reference point and a time instance where random access occasions are triggered, wherein the reference point is either a reception of the downlink control signal or is network-configured via a common control signaling reference point.

3. The method of claim 1, further comprising:
   updating at least one of the one or more random access parameters based at least in part on the downlink control signal.

4. The method of claim 1, wherein the downlink control signal is associated with a subset of the plurality of random access occasions and a corresponding subset of random access preambles.

5. The method of claim 1, further comprising:
   initiating a listen-before-talk procedure prior to outputting the random access signal for transmission.

6. The method of claim 1, wherein the downlink control signal comprises at least one of a first timing offset for a random access occasion relative to the downlink control signal, a second timing offset for a random access occasion relative to a reference point indicated by a network, a time-frequency resource for the random access signal, an index value corresponding to a time-frequency resource for the random access signal, a preamble configuration for the random access signal, a time duration in which the plurality of random access occasions are triggered, a configuration to map one or more synchronization signal blocks to the plurality of random access occasions and random access preambles, an indication of a subset of the plurality of random access occasions, an indication of a symbol occurring prior to a random access occasion in which an intent to transmit transmission will occur, a listen-before-talk configuration associated with the plurality of random access occasions, or a combination thereof.

7. The method of claim 1, wherein the one or more random access parameters comprise at least one of a random access signal waveform configuration, a format for the random access signal, a time-frequency resource for the random access signal, a repetition factor for a pattern of a plurality of random access occasions, a preamble configuration for the random access signal, a timing advance for the random access signal, an indication of a symbol occurring prior to a random access occasion in which an intent to transmit transmission will occur, a first timing offset for a random access occasion relative to the downlink control signal, a second timing offset for a random access occasion relative to a reference point indicated by a network, a time duration in which the plurality of random access occasions are triggered, a listen-before-talk configuration associated with the plurality of random access occasions, or a combination thereof.

8. The method of claim 1, wherein the signal configuring the one or more random access parameters comprises an indication of at least one of a control resource set, a search space configuration, a downlink control signal format, or a combination thereof, for obtaining the downlink control signal.

9. The method of claim 1, wherein the signal configuring the one or more random access parameters comprises at least one of a radio resource control signal, a system information signal, or a combination thereof.

10. A method for wireless communication at a network device, comprising:
outputting a signal for transmission over a wireless channel, the signal configuring one or more random access parameters for the wireless channel;
outputting a downlink control signal for transmission over the wireless channel, wherein the downlink control signal comprises an indication of a resource location of a plurality of random access occasions for a user equipment (UE) and a trigger for the plurality of random access occasions;
obtaining, based at least in part on the downlink control signal, a random access signal received over the wireless channel during at least one of the plurality of random access occasions and according to the one or more random access parameters and the resource location;
obtaining, prior to obtaining the random access signal, an indication of intent to transmit the random access signal during the at least one of the plurality of random access occasions, wherein the indication of intent to transmit the random access signal is obtained prior to the plurality of random access occasions used for transmission of the random access signal;
refraining from reclaiming or rescheduling the at least one of the plurality of random access occasions based at least in part on the indication of intent; and
establishing a connection with the UE based at least in part on the random access signal.

11. The method of claim 10, further comprising:
configuring the downlink control signal to indicate a timing offset between a reference point and a time instance when random access occasions are triggered, wherein the reference point is either the transmission of the downlink control signal or is network-configured via a common control signaling reference point.

12. The method of claim 10, further comprising:
configuring the downlink control signal to indicate an update for at least one of the one or more random access parameters.

13. The method of claim 10, wherein the downlink control signal is associated with a subset of the plurality of random access occasions and a corresponding subset of random access preambles.

14. The method of claim 10, further comprising:
initiating a listen-before-talk procedure prior to outputting at least one of the signal, the downlink control signal, or a combination thereof, for transmission.

15. The method of claim 10, wherein the downlink control signal comprises at least one of a first timing offset for a random access occasion relative to the downlink control signal, a second timing offset for a random access occasion relative to a reference point indicated by a network, a time-frequency resource for the random access signal, an index value corresponding to a time-frequency resource for the random access signal, a preamble configuration for the random access signal, a time duration in which the plurality of random access occasions are triggered, a configuration to map one or more synchronization signal blocks to the plurality of random access occasions and random access preambles, an indication of a subset of the plurality of random access occasions, an indication of a symbol occurring prior to a random access occasion in which an intent to transmit transmission will occur, a listen-before-talk configuration associated with the plurality of random access occasions, or a combination thereof.

16. The method of claim 10, wherein the one or more random access parameters comprise at least one of a random access signal waveform configuration, a format for the random access signal, a time-frequency resource for the random access signal, a repetition factor for a pattern of a plurality of random access occasions, a preamble configuration for the random access signal, a timing advance for the random access signal, an indication of a symbol occurring prior to a random access occasion in which an intent to transmit transmission will occur, a first timing offset for a random access occasion relative to the downlink control signal, a second timing offset for a random access occasion relative to a reference point indicated by a network, a time duration in which the plurality of random access occasions are triggered, a listen-before-talk configuration associated with the plurality of random access occasions, or a combination thereof.

17. The method of claim 10, wherein the signal configuring the one or more random access parameters comprises an indication of at least one of a control resource set, a search space configuration, a downlink control signal format, or a combination thereof, for obtaining the downlink control signal.

18. The method of claim 10, wherein the signal configuring the one or more random access parameters comprises at least one of a radio resource control signal, a system information signal, or a combination thereof.

19. An apparatus for wireless communication at a user equipment (UE), comprising:
a processor,
memory coupled with the processor; and
instructions stored in the memory and executable by the processor to cause the apparatus to:
obtain a signal received over a wireless channel, the signal configuring one or more random access parameters for the wireless channel;
obtain a downlink control signal over the wireless channel, wherein the downlink control signal comprises an indication of a resource location of a plurality of random access occasions for the UE and a trigger for the plurality of random access occasions;
output, based at least in part on the downlink control signal, a random access signal for transmission on the wireless channel during at least one of the plurality of random access occasions and according to the one or more random access parameters and the resource location;

output, for transmission to a network device, an indication of intent to transmit the random access signal during the at least one of the plurality of random access occasions, wherein the indication of intent to transmit the random access signal is output for transmission prior to the plurality of random access occasions used for transmission of the random access signal and the indication of intent indicates to the network device to refrain from reclaiming or rescheduling the at least one of the plurality of random access occasions; and establish a connection with the network device based at least in part on the random access signal.

20. The apparatus of claim 19, wherein the instructions are further executable by the processor to cause the apparatus to:

identify, based at least in part on the downlink control signal, a timing offset between a reference point and a time instance where random access occasions are triggered, wherein the reference point is either a reception of the downlink control signal or is network-configured via a common control signaling reference point.

21. The apparatus of claim 19, wherein the instructions are further executable by the processor to cause the apparatus to:

update at least one of the one or more random access parameters based at least in part on the downlink control signal.

22. The apparatus of claim 19, wherein the downlink control signal is associated with a subset of the plurality of random access occasions and a corresponding subset of random access preambles.

23. The apparatus of claim 19, wherein the instructions are further executable by the processor to cause the apparatus to:

initiate a listen-before-talk procedure prior to outputting the random access signal for transmission.

24. An apparatus for wireless communication at a network device, comprising:

a processor, memory coupled with the processor; and instructions stored in the memory and executable by the processor to cause the apparatus to:

output a signal for transmission over a wireless channel, the signal configuring one or more random access parameters for the wireless channel;

output a downlink control signal for transmission over the wireless channel, wherein the downlink control signal comprises an indication of a resource location of a plurality of random access occasions for a user equipment (UE) and a trigger for the plurality of random access occasions;

obtain, based at least in part on the downlink control signal, a random access signal received over the wireless channel during at least one of the plurality of random access occasions and according to the one or more random access parameters and the resource location;

obtain, prior to the random access signal, an indication of intent to transmit the random access signal during the at least one of the plurality of random access occasions, wherein the indication of intent to transmit the random access signal is obtained prior to the plurality of random access occasions used for transmission of the random access signal;

refrain from reclaiming or rescheduling the at least one of the plurality of random access occasions based at least in part on the indication of intent; and establish a connection with the UE based at least in part on the random access signal.

25. The apparatus of claim 24, wherein the instructions are further executable by the processor to cause the apparatus to:

configure the downlink control signal to indicate a timing offset between a reference point and a time instance when random access occasions are triggered, wherein the reference point is either the transmission of the downlink control signal or is network-configured via a common control signaling reference point.

26. The apparatus of claim 24, wherein the instructions are further executable by the processor to cause the apparatus to:

configure the downlink control signal to indicate an update for at least one of the one or more random access parameters.

27. The apparatus of claim 24, wherein the downlink control signal is associated with a subset of the plurality of random access occasions and a corresponding subset of random access preambles.

28. The method of claim 1, wherein the plurality of random access occasions are inside a channel occupancy time, outside the channel occupancy time, or any combination thereof.

29. The method of claim 1, wherein the downlink control signal comprises one or more listen-before-talk configurations, the one or more listen-before-talk configurations associated with the plurality of random access occasions being inside a channel occupancy time, outside the channel occupancy time, or any combination thereof.

* * * * *